US 008297844B2

(12) United States Patent
Hirade et al.

(10) Patent No.: US 8,297,844 B2
(45) Date of Patent: Oct. 30, 2012

(54) FLUID DYNAMIC BEARING DEVICE

(75) Inventors: Jun Hirade, Kuwana (JP); Kimihiko Bito, Kuwana (JP); Tetsuya Yamamoto, Kuwana (JP)

(73) Assignee: NTN Corporation, Osaka-shi (JP)

( * ) Notice: Subject to any disclaimer, the term of this patent is extended or adjusted under 35 U.S.C. 154(b) by 382 days.

(21) Appl. No.: 12/670,437

(22) PCT Filed: Aug. 12, 2008

(86) PCT No.: PCT/JP2008/064446
§ 371 (c)(1),
(2), (4) Date: Jan. 25, 2010

(87) PCT Pub. No.: WO2009/025202
PCT Pub. Date: Feb. 26, 2009

(65) Prior Publication Data
US 2010/0202715 A1     Aug. 12, 2010

(30) Foreign Application Priority Data

Aug. 20, 2007  (JP) .................................. 2007-213706
Aug. 30, 2007  (JP) .................................. 2007-224257
Jun. 16, 2008  (JP) .................................. 2008-156740

(51) Int. Cl.
*F16C 32/06*        (2006.01)
(52) U.S. Cl. .................................. 384/100; 384/121
(58) Field of Classification Search .................. 384/100, 384/107–124
See application file for complete search history.

(56) References Cited

U.S. PATENT DOCUMENTS

| 6,390,681 | B1 | 5/2002 | Nakazeki et al. |
| 6,717,310 | B2 * | 4/2004 | Yoshikawa et al. ........... 384/107 |
| 2002/0012483 | A1 | 1/2002 | Miura et al. |
| 2002/0185925 | A1 | 12/2002 | Yoshikawa et al. |
| 2004/0213489 | A1 | 10/2004 | Sumi et al. |
| 2005/0254735 | A1 | 11/2005 | Satoji et al. |
| 2006/0202577 | A1 * | 9/2006 | Maekawa et al. ............. 384/100 |
| 2007/0110348 | A1 * | 5/2007 | Obara ........................... 384/107 |

FOREIGN PATENT DOCUMENTS

| CN | 1391325 A | 1/2003 |
| CN | 1678838 A | 10/2005 |
| JP | 2000-324753 A | 11/2000 |
| JP | 2003-056567 A | 2/2003 |
| JP | 2004-340368 A | 12/2004 |

(Continued)

OTHER PUBLICATIONS

Notification of Transmittal of Translation of the International Preliminary Report on Patentability (Form PCT/IB/338) of International Application No. PCT/JP2008/064446 mailed Mar. 18, 2010 with Forms PCT/IB/373 and PCT/ISA/237.

(Continued)

*Primary Examiner* — Thomas R Hannon
(74) *Attorney, Agent, or Firm* — Westerman, Hattori, Daniels & Adrian, LLP

(57) ABSTRACT

To manufacture a shaft member, which is excellent in both accuracy and strength at low cost, a shaft member (2) includes a shaft portion (21) and a flange portion (22) provided to one end of the shaft portion (21). The flange portion (22) has an annular shape, and the shaft portion (21) and the flange portion (22) are fixed by a welded portion (23), which is formed by applying a laser beam (35) to an upper end of an inner periphery thereof.

13 Claims, 15 Drawing Sheets

FOREIGN PATENT DOCUMENTS

JP        3774080 B2    5/2006

OTHER PUBLICATIONS

International Search Report of PCT/JP2008/064446, mailing date of Nov. 4, 2008.

Chinese Office Action dated Apr. 25, 2012, issued in corresponding Chinese Patent Application No. 200880102673.0, (Partial English Translation, 7 pages).

* cited by examiner

FLUID DYNAMIC BEARING DEVICE

TECHNICAL FIELD

The present invention relates to a fluid dynamic bearing device.

BACKGROUND OF THE INVENTION

A fluid dynamic bearing device is a bearing device which rotatably supports a shaft member through an oil film formed in bearing gaps. The fluid dynamic bearing device has characteristics such as high-speed rotation operation, high rotational accuracy, and quietness. In recent years, by taking advantage of those characteristics, the fluid dynamic bearing device is suitably used as a bearing device for a motor to be mounted to various electrical apparatuses such as information equipment. Specifically, as a bearing device for a motor, the fluid dynamic bearing device may be suitably used in the following: a spindle motor for an information apparatus such as a magnetic disk drive such as an HDD, an optical disk drive for a CD-ROM, CD-R/RW, DVD-ROM/RAM, or the like, or a magneto-optical disk drive for an MD, MO, or the like; a polygon scanner motor of a laser beam printer (LBP); a color wheel motor of a projector; or a fan motor.

For example, a fluid dynamic bearing device for a spindle motor includes a bearing sleeve, and a shaft member inserted along an inner periphery of the bearing sleeve and rotated relative to the bearing sleeve. As the shaft member used in many cases, there may be given one having a flange portion provided at one end of a shaft portion. In this case, radial bearing gaps are formed between an outer peripheral surface of the shaft portion and an inner peripheral surface of the bearing sleeve, and a thrust bearing gap is formed between at least one of end surfaces of the flange portion and a surface opposed thereto (end surface of the bearing sleeve, for example). As types of the shaft member with a flange, there may be given an integration type in which the shaft portion and the flange portion are formed integrally with each other by machine processing such as cutting and a separation type in which the shaft portion and the flange portion are individually manufactured and integrated with each other by an appropriate means.

In the integration type of the shaft member with a flange, although high fastening strength can be secured between the shaft portion and the flange portion, dedicated processing facilities is required for manufacturing the shaft member with a flange, which leads to a remarkable increase in cost. Thus, in recent years, the shaft member with a flange is formed in a separation type in some cases.

As the separation type of the shaft member with a flange, there are well-known various ones. Among those, as a structure in which high fastening strength can be secured between the shaft portion and the flange portion, there is well-known one in which the shaft portion and the flange portion are integrated with each other by welding as disclosed, for example, in JP 3774080 B (Patent Document 1). Further, JP 2004-340368 A (Patent Document 2) discloses a structure in which the shaft member and the flange portion are integrated with each other by welding, specifically, by resistance welding.

Patent Document 1: JP 3774080 B
Patent Document 2: JP 2004-340368 A

SUMMARY OF THE INVENTION

As disclosed in Patent Document 1 mentioned above, when the shaft portion and the flange portion are welded to each other, high fastening strength can be secured therebetween. However, for example, when one end of the shaft portion is fitted to a flange portion having an annular shape and the fitting portion therebetween is welded, molten matters such as metal particles generated at the time of welding may be dispersed and adhere to the outer peripheral surface of the shaft portion and the end surface of the flange portion, the outer peripheral surface and the end surface each constituting one of the surfaces which form bearing gaps. Further, the welded portion is formed at a part adjacent to the bearing gaps, and hence it is necessary to give extra consideration to the shape thereof. Those problems can be solved by elaboration of a welding operation or by performing additional finish-processing after welding. However, in this case, there arises a problem of a remarkable increase in processing cost.

Meanwhile, in the shaft member with a flange which is disclosed in Patent Document 2, a minute annular protrusion is formed on any one of end surfaces of each of the shaft portion and the flange portion opposed to each other, and a recessed portion is provided adjacent to the protrusion. The protrusion is molten by application of a voltage in a state in which a leading end of the protrusion is held in contact with another of the end surfaces so that the shaft portion and the flange portion are fixed to each other by welding. With this structure, molten parts of the protrusion are accommodated in the recessed portion, and hence it is probable that the above-mentioned problems can be solved. Further, it is possible to prevent the molten parts from intruding into between the contact surfaces of the shaft portion and the flange portion on the outside of the welded portion, and hence it is also probable that assembly accuracy can be increased. However, in order to secure desired accuracy (coaxiality, perpendicularity, and the like) and fastening strength between the shaft portion and the flange portion, it is necessary to form the annular protrusion with high accuracy and to control postures of the shaft portion and the flange portion at the time of assembly with high accuracy. Thus, there arises a problem that the remarkable increase in processing cost is inevitable. For example, although it is possible to secure coaxiality between the shaft portion and the flange portion by regulating the postures thereof with jigs, the shaft portion and the flange portion are held in point contact with each other when perpendicularity between the end surface and the outer peripheral surface of the shaft portion is insufficient. Thus, it is difficult to secure uniform welding strength over the entire circumference thereof, and hence fastening strength required between the shaft portion and the flange portion may be insufficient.

The present invention has been made in view of the above-mentioned problems, and it is an object of the present invention to provide a shaft member with a flange at low cost, the shaft member being excellent in both accuracy and strength.

In order to solve the above-mentioned problems, according to a first structure of the present invention, there is provided a fluid dynamic bearing device, including: a shaft member including a shaft portion and a flange portion provided at one end of the shaft portion; radial bearing gaps formed with an outer peripheral surface of the shaft portion; and thrust bearing gaps formed with end surfaces of the flange portion, in which the flange portion has an annular shape and a welded portion formed on an inner periphery of shaft-portion-side one end thereof, the welded portion being formed by fixing the flange portion and the shaft portion to each other by welding.

As described above, the welded portion formed by fixing the shaft portion and the flange portion by welding is provided on the inner periphery of the shaft-portion-side one end of the flange portion having an annular shape. Thus, it is possible to effectively suppress or prevent molten matters such as metal particles generated at the time of welding from being dispersed and adhering to the outer peripheral surface of the shaft portion and the end surface of the flange portion. Further, the welded portion is formed on the inner periphery of the flange portion having an annular shape, and hence the formation mode thereof does not have any influence on the accuracy of the bearing gaps. Accordingly, without elaboration of a welding operation or performing additional finish-processing, it is possible to manufacture the shaft member with a flange excellent in both accuracy and strength at low cost.

As described above, for example, when a structure is adopted in which one end of the shaft portion is fitted to the flange portion having an annular shape and then the fitting portion therebetween is welded, perpendicularity between the shaft portion and the flange portion after welding depends on processing accuracy of the fitting surface (press-fitting surface). Thus, when the shaft portion and the flange portion are fixed (welded) to each other, it is necessary to finish not only the outer peripheral surface of the shaft portion but also the inner peripheral surface of the flange portion with high accuracy in advance, the outer peripheral surface constituting one of the surfaces which form the radial bearing gap. As a result, an increase in processing cost is involved. In this context, the present invention provides a structure in which the welded portion is formed in a state of end-surface contact in which end surfaces of the shaft portion and the flange portion are held in contact with each other. With this structure, the perpendicularity between the shaft portion and the flange portion can be controlled with jigs used at the time of welding, and hence the shaft member with high accuracy can be mass-produced at low cost. In this regard, this structure is desirable.

With the first structure described above, it is possible to provide an aligning surface on the shaft portion so as to bring the aligning surface into contact with an inner peripheral edge portion of the flange portion (strictly, inner peripheral edge portion of the shaft-portion-side one end), or possible to provide the aligning surface on the inner peripheral edge portion of the flange portion (inner peripheral edge portion of the shaft-portion-side one end) so as to bring the shaft member into contact with the aligning surface. With those structures, the flange portion is allowed to rock in a swinging manner with respect to the shaft portion, and hence it is possible to perform alignment between the shaft portion and the flange portion more easily and with higher accuracy. Note that, as modes of the aligning surfaces, there may be provided a tapered surface gradually reduced in diameter toward the counterpart member and a convex-curved surface.

The welded portion described above can be formed by application of a laser beam to the inner periphery of the flange portion. Generally, an outer diameter of the flange portion is set approximately to 5 to 10 mm, and an inner diameter thereof is set approximately to 1 to 2 mm. Thus, it is difficult to form the welded portion with high accuracy by other welding methods. However, even a minute welded portion can be formed with high accuracy by laser welding.

Further, the welded portion may be formed by application of a laser beam to a protrusion provided at the shaft-portion-side one end of the inner peripheral surface of the flange portion. With this, the melting range of the inner peripheral surface of the flange portion is limited, and hence it is possible to suppress the thermal influence to the flange portion to the minimum, and to prevent the deformation thereof more effectively. Accordingly, it is possible to omit finish-processing after welding, the finish-processing being required owing to deformation of the flange portion. In this regard, the formation is desirable.

The welded portion may be formed over the entire of a circumferential direction of the inner periphery of the flange portion, or may be intermittently formed in the circumferential direction of the inner periphery of the flange portion. The former structure has a merit of increasing fastening strength therebetween in comparison with that in the latter structure, and the latter structure has a merit of reducing the risk of deformation of the flange portion due to thermal influence at the time of welding in comparison with that in the former structure.

Further, in order to solve the above-mentioned problems, according to a second structure of the present invention, there is provided a fluid dynamic bearing device, including: a shaft member including a shaft portion and a flange portion provided at one end of the shaft portion; radial bearing gaps formed with an outer peripheral surface of the shaft portion; and thrust bearing gaps formed with end surfaces of the flange portion, in which the shaft portion and the flange portion are fixed to each other by welding in a state in which an aligning mechanism is interposed therebetween and both the shaft portion and the flange portion are held in linear contact with each other. Note that, the aligning mechanism herein refers to a mechanism capable of realizing a relation in which any one of the shaft portion and the flange portion is rockable in a swinging manner with respect to another thereof.

As described above, when the aligning mechanism is interposed between the shaft portion and the flange portion so that the shaft portion and the flange portion are fixed by welding while being held in linear contact with each other, preferably, contact with each other in a ring shape, any one of the shaft portion and the flange portion is allowed to rock in a swinging manner with respect to another thereof. Thus, merely by regulating the relative posture of the shaft portion and the flange portion with assembly jigs, it is possible to perform centering between the shaft portion and the flange portion and to perform alignment therebetween with high accuracy. That is, it is possible to lessen processing accuracy of each of the shaft portion and the flange portion, and hence to decrease the processing cost thereof. Further, in this case, the shaft portion and the flange portion are welded to each other while being held in linear contact, preferably, contact with each other in a ring shape, and hence welding strength can be increased.

Note that, although resistance welding may be adopted as a welding method, the laser welding is more desirable. This is because, in the resistance welding, there is a tendency that welding strength becomes higher in reverse proportion to the size of contact area between the members to be welded, and hence, in the laser welding, there may be given an advantage in welding strength to the structure of the present invention in which the shaft portion and the flange portion are fixed by welding while being held in linear contact with each other. Further, in the resistance welding, the materials for forming the shaft portion and the flange portion are limited to conductive metals. Meanwhile, in the laser welding, it is unnecessary to consider whether the conductivity thereof is high/low or exists/does not exist, and possible to secure high welding strength even between the different metals. Accordingly, without consideration of welding properties, the shaft portion and the flange portion can be formed of the optimum materials satisfying required quality as that of the shaft member.

As a specific structure of the above mentioned aligning mechanism, the following aligning mechanism is exemplified. Specifically, the aligning mechanism is formed on any one of the shaft portion and the flange portion and includes: an aligning surface gradually reduced in diameter toward another one of the shaft portion and the flange portion; and recessed portion formed in the another one of the shaft portion and the flange portion so as to accommodate a leading end of the aligning surface. The aligning mechanism may be constituted by being provided with an additional member other than the shaft portion and the flange portion, which is not desirable because provision of the additional member involves an increase in cost. In this regard, as described above, when the aligning mechanism is constituted by the aligning surface formed on any one of the shaft portion and the flange portion and by a recessed portion provided on another thereof, it is possible to prevent the above-mentioned increase in cost. Thus, this structure is desirable.

The aligning surface may be formed in a tapered shape or a convex-curved shape. In consideration of easiness of processing (processing cost) of the aligning surface, it is advantageous that the aligning surface is formed in a tapered shape. Meanwhile, as described above, the aligning mechanism of the present invention is a mechanism which realizes the relation in which any one of the shaft portion and the flange portion is rockable in a swinging manner with respect to another thereof, in other words, a mechanism capable of not only performing alignment between the shaft portion and the flange portion but also of correcting the perpendicularity therebetween. Thus, in consideration of those matters, it may be advantageous in some cases that the aligning surface is formed in a convex-curved shape. Specifically, in the case where the aligning surface is formed in a convex-curved shape, even when the inner peripheral edge of the recessed portion is formed in any form, it is possible to simultaneously perform alignment and correction of the perpendicularity between the shaft portion and the flange portion while securing a linear contact state of the shaft portion and the flange portion. In contrast, in the case where the aligning surface is formed in a tapered shape, in order to simultaneously perform alignment and correction of the perpendicularity between the shaft portion and the flange portion while securing a linear contact state of the shaft portion and the flange portion, it is necessary to form the inner peripheral edge of the recessed portion as the convex-curved surface (round surface). For those reasons, instead of uniquely determining whether the aligning surface is formed in a tapered shape or a convex-curved shape, it is possible to arbitrarily select the same not only in consideration of easiness of processing of the aligning surface but also in consideration of, for example, the materials for forming the shaft portion and the flange portion, that is, processing cost of the shaft member as a whole.

With the second structure of the present invention, the shaft portion and the flange portion can be fixed to each other by welding in the inside of the recessed portion. When the shaft portion and the flange portion are fixed to each other by welding in the inside of the recessed portion in this manner, thermal influence at the time of welding is less liable to reach the outer peripheral surface of the shaft portion and the end surface of the flange portion, the surfaces form bearing gaps. Thus, it is possible to avoid as much as possible deterioration of surface accuracy of those surfaces. Further, it is possible to effectively avoid adverse effects on bearing performance which are caused by welding marks protruding on the outer periphery of the shaft portion and on the one end of the flange portion. In addition, when the shaft portion and the flange portion are subjected to laser welding, molten matters may be dispersed in accordance with application of the laser beam and adhere to the end surface of the flange portion. However, when the shaft portion and the flange portion are welded to each other in the inside of the recessed portion, it is possible to cover the welded part with the recessed portion. Thus, it is possible to reduce a risk that the molten matters may adhere, for example, to the end surface of the flange portion (thrust bearing surface).

The fluid dynamic bearing device according to the present invention has the above-mentioned features, and hence can be suitably used while being incorporated in a motor including a stator coil and a rotor magnet, for example, in a spindle motor for a disk drive.

As described above, according to the present invention, it is possible to manufacture a shaft member with a flange at low cost, the shaft member being excellent in both accuracy and strength. With this, it is possible to provide, at low cost, a fluid dynamic bearing device capable of maintaining high rotational accuracy over a long period of time.

DETAILED DESCRIPTION OF THE INVENTION

In the following, embodiments of the present invention are described with reference to drawings.

Figure 1:
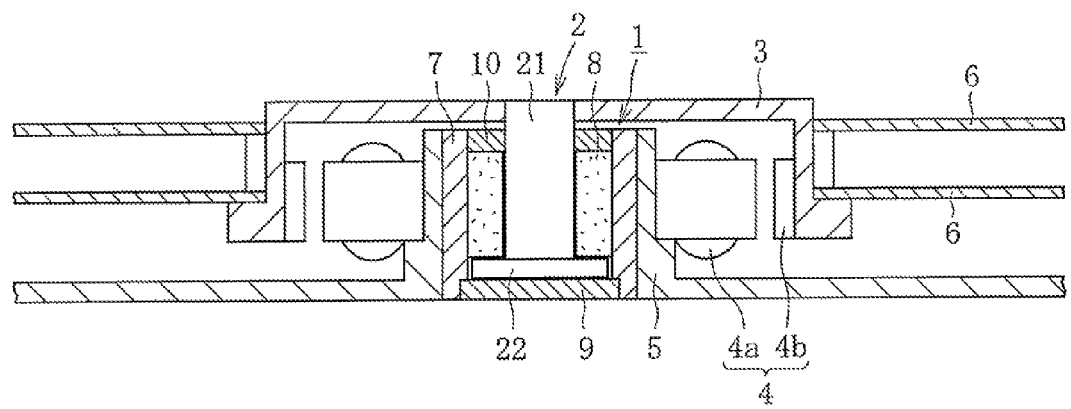
FIG. 1 is a sectional view conceptually illustrating an example of a spindle motor for an information apparatus incorporating a fluid dynamic bearing device.

FIG. 1 conceptually illustrates a structural example of a spindle motor for an information apparatus, which incorporates a fluid dynamic bearing device. The spindle motor is used for a disk drive such as an HDD and includes a fluid dynamic bearing device 1 for rotatably supporting a shaft member 2, a disk hub 3 fixed to the shaft member 2, a stator coil 4a and a rotor magnet 4b which are opposed to each other through an intermediation of, for example, a gap in a radial direction, and a bracket 5. The stator coil 4a is attached to an outer periphery of the bracket 5 and the rotor magnet 4b is attached to an inner periphery of the disk hub 3. A housing 7 of the fluid dynamic bearing device 1 is fixed to an inner periphery of the bracket 5. One or a plurality of disks (two in illustration) 6 such as magnetic disks are held by the disk hub 3. When the stator coil 4a is energized, the rotor magnet 4b is rotated by an electromagnetic force between the stator coil 4a and the rotor magnet 4b. With this, the disk hub 3 and the disks 6 are rotated integrally with the shaft member 2.

Figure 2:
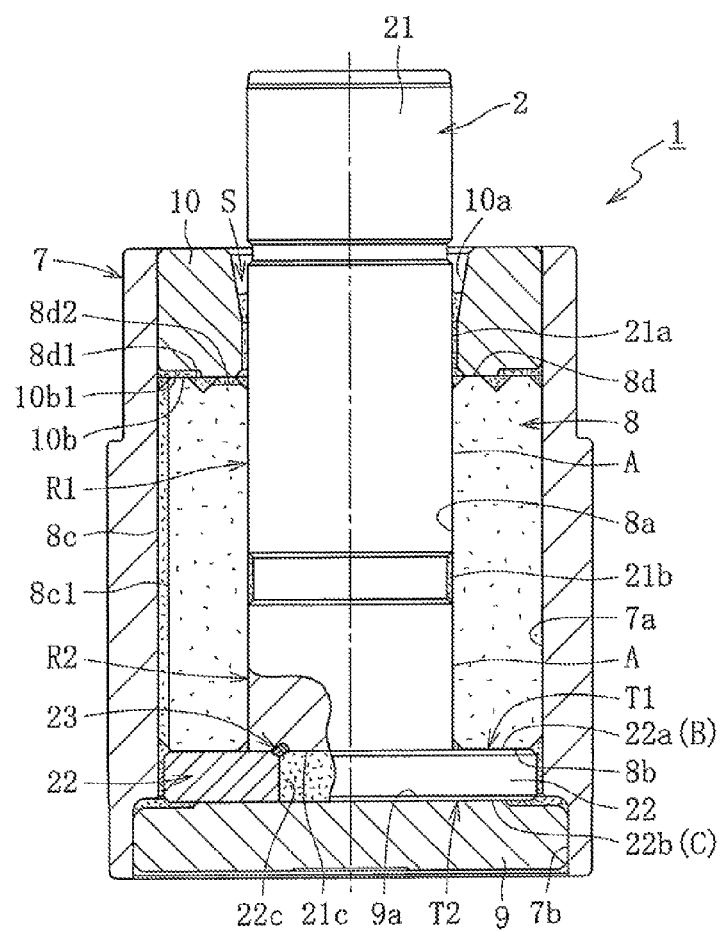
FIG. 2 is a sectional view of a fluid dynamic bearing device according to a first embodiment of the present invention, the fluid dynamic bearing device adopting a first structure of the present invention.

FIG. 2 illustrates a first embodiment of the fluid dynamic bearing device 1 adopting a first structure of the present invention. The fluid dynamic bearing device 1 illustrated in FIG. 2 includes the housing 7, the bearing sleeve 8 fixed along the inner periphery of the housing 7, the shaft member 2 inserted into the inner periphery of the bearing sleeve 8, a lid member 9 sealing an opening of one end of the housing 7, and a sealing member 10 sealing an opening of another end of the housing 7. Note that, in the following, for the sake of convenience in illustration, the side of the sealing member 10 is referred to as the upper side, and the opposite side in an axial direction is referred to as the lower side.

The housing 7 is formed in a cylindrical shape with use of a metal material such as brass or a resin material. To an inner peripheral surface 7a of the housing 7, the bearing sleeve 8 is fixed by an appropriate means such as bonding, press-fitting, and welding. On a lower end side of the inner peripheral surface 7a, there is formed a lid-member fixation surface 7b radially larger than the inner peripheral surface 7a.

The bearing sleeve 8 is formed in a cylindrical shape of a porous body formed of a sintered metal containing copper as a main component, for example. The bearing sleeve 8 may be formed of a soft metal other than the sintered metal, such as brass, or may be formed of a porous body other than that of the sintered metal (a porous resin, for example).

Figure 3A:
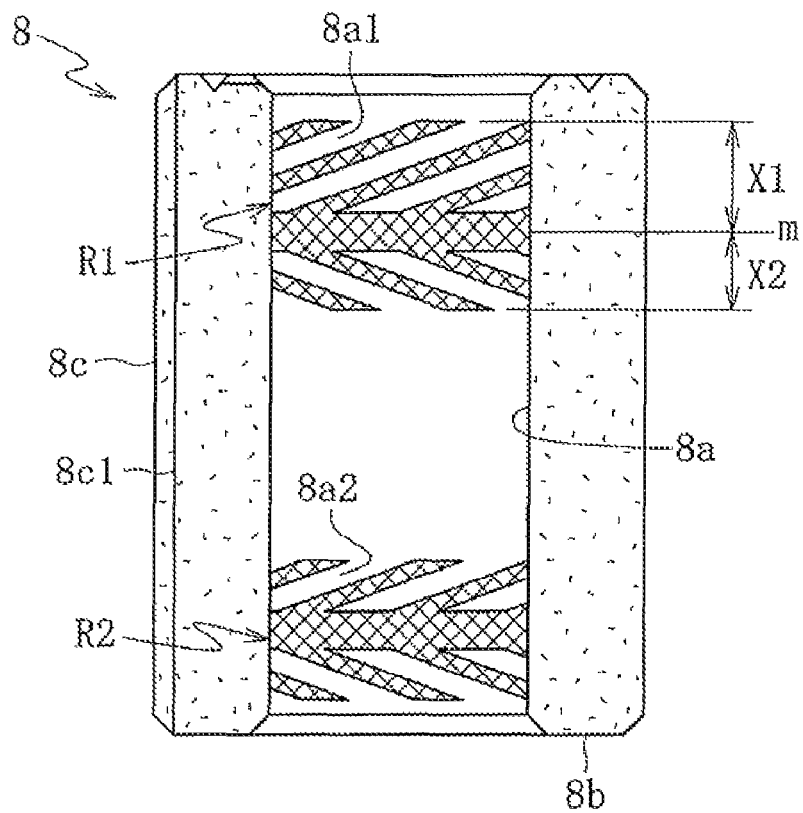
FIG. 3A is a sectional view of a bearing sleeve illustrated in FIG. 2.

As illustrated in FIG. 3A, separately from each other at two portions in the axial direction on an inner peripheral surface 8a of the bearing sleeve 8, there are formed, as radial dynamic pressure generating portions, cylindrical regions constituted by a plurality of dynamic pressure generating grooves 8a1 and 8a2 arranged in a herringbone pattern. In this embodiment, upper dynamic pressure generating grooves 8a1 are formed asymmetrically with each other in the axial direction with respect to an axial center m (axial center of a region between the upper and lower inclined grooves), and an axial dimension X1 of an upper region with respect to the axial center m is larger than an axial dimension X2 of a lower region. Meanwhile, the lower dynamic pressure generating grooves 8a2 are formed symmetrically with each other in the axial direction, and axial dimensions of the upper and lower regions are equal to the axial dimension X2 described above, respectively. Note that, the dynamic pressure generating grooves may be formed in a radial bearing surface A of a shaft portion 21 described later, and may be formed in another well-known pattern such as a spiral pattern.

Figure 3B:
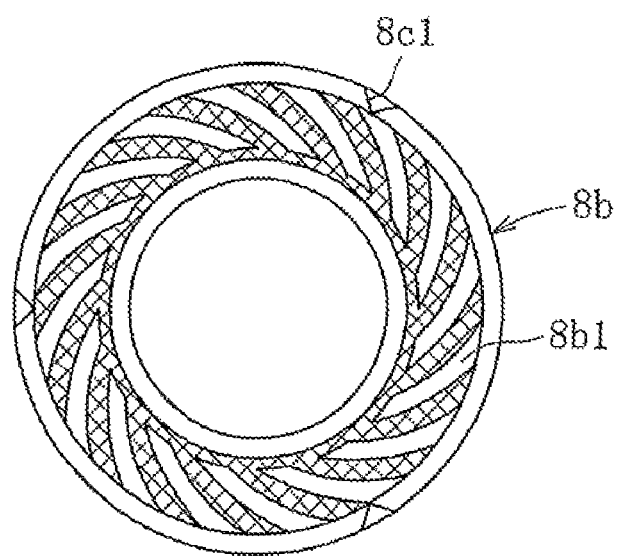
FIG. 3B is a view of a lower end surface of the bearing sleeve illustrated in FIG. 2.

As illustrated in FIG. 3B, on a lower end surface 8b of the bearing sleeve 8, there is formed, as a thrust dynamic pressure generating portion, an annular region in which a plurality of dynamic pressure generating grooves 8b1 are arranged in a spiral pattern. Note that, the dynamic pressure generating grooves (thrust dynamic pressure generating portion) may be formed in a thrust bearing surface B of a flange portion 22 described later, and may be formed in another well-known pattern such as a herringbone pattern.

In an outer peripheral surface 8c of the bearing sleeve 8, there are formed one or a plurality of axial grooves 8c1 opening in both end surfaces. Further, in an upper end surface 8d of the bearing sleeve 8, there are formed an annular groove 8d1 and one or a plurality of radial grooves 8d2 connected to a radially inner side of the annular groove 8d1.

The lid member 9 is formed in a disk-like shape with use of, for example, a metal material or a resin material, and is fixed to the lid-member fixation surface 7b of the housing 7 by an appropriate means such as bonding and press-fitting. While not shown, on an upper end surface 9a of the lid member 9, there is formed, as a thrust dynamic pressure generating portion, an annular region in which a plurality of dynamic pressure generating grooves are arranged in a spiral pattern or a herringbone pattern. The dynamic pressure generating grooves may be formed in a thrust bearing surface C of the flange portion 22 described later.

The seal member 10 is formed in an annular shape with use of, for example, a soft metal material such as brass, another metal material, or a resin material, and is fixed to an upper end portion of the inner peripheral surface 7a of the housing 7 by an appropriate means such as bonding and press-fitting. Between an inner peripheral surface 10a of the seal member 10 and an outer peripheral surface 21a of the shaft portion 21, the predetermined seal space S is formed so as to have a predetermined volume. The seal space S has a buffering function of absorbing an amount of change in volume in accordance with change in temperature of a lubricating oil filling the fluid dynamic bearing device 1. An oil surface of the lubricating oil is constantly maintained with a range of the seal space S within an expected range of change in temperature. On a radially outer side of a lower end surface 10b of the seal member 10, there are formed one or a plurality of radial grooves 10b1.

The shaft member 2 includes the shaft portion 21 and the flange portion 22 protruding from a lower end of the shaft portion 21 to a radially outer side. The shaft portion 21 is formed as a solid shaft with use of a metal material having high rigidity, that is, stainless steel in this embodiment, and the flange portion 22 is formed in an annular shape with use of stainless steel as well. The flange portion 22 is fixed by welding to the shaft portion 21 through intermediation of a welded portion 23 formed on an inner periphery of the flange portion 22, more strictly, on an inner periphery of an upper surface of the flange portion 22, which is specifically described later. Separately from each other at two portions in the axial direction on the outer peripheral surface 21a of the shaft portion 21, there are formed radial bearing surfaces A and A having a shape of a flat and smooth cylindrical surface and facing, in a radial direction, the regions which are provided on the inner peripheral surface 8a of the bearing sleeve 8 and in which the dynamic pressure generating grooves 8a1 and 8a2 are formed. Between both the radial bearing surfaces A and A, there is formed a grooved portion 21b radially smaller than the radial bearing surfaces A and A.

On an upper end surface 22a of the flange portion 22, the thrust bearing surface B is provided so as to face, in the thrust direction, the region which is provided on the lower end surface 8b of the bearing sleeve 8 and in which the dynamic pressure generating grooves 8b1 are formed. Further, on a lower end surface 22b thereof, the thrust bearing surface C is provided so as to face, in the thrust direction, the region which is provided on upper end surface 9a of the lid member 9 and in which the dynamic pressure generating grooves are formed. Both the thrust bearing surfaces B and C are flat and smooth surfaces without the dynamic pressure generating grooves or the like.

The fluid dynamic bearing device 1 includes the components described above, and the lubricating oil fills an inner space of the housing 7 sealed with the seal member 10, the inner space including inner pores of the bearing sleeve 8. Further, in this case, the lubricating oil also fills a space defined by an inner peripheral surface 22c of the flange portion 22 and a lower end surface 21c of the shaft portion 21.

When the shaft member 2 is rotated in the fluid dynamic bearing device 1 structured as described above, radial bearing gaps are formed respectively between the regions in which the dynamic pressure generating grooves 8a1 and 8a2 of the bearing sleeve 8 are formed and the radial bearing surfaces A and A of the shaft portion 21. Then, in accordance with the rotation of the shaft member 2, oil film rigidity of oil films formed in the radial bearing gaps is increased by the dynamic pressure effect of the dynamic pressure generating grooves 8a1 and 8a2, and the shaft member 2 is rotatably supported by the pressure thereof in the radial direction in a non-contact manner. With this, separately from each other at two portions in the axial direction, there are formed radial bearing portions R1 and R2 for rotatably supporting the shaft member 2 in the radial direction in a non-contact manner.

Further, simultaneously, thrust bearing gaps are formed between the thrust bearing surface B of the flange portion 22 and the lower end surface 8b of the bearing sleeve 8 and between the thrust bearing surface C of the flange portion 22 and the upper end surface 9a of the lid member 9, respectively. Then, in accordance with the rotation of the shaft member 2, oil film rigidity of oil films formed in both the thrust bearing gaps is increased by the dynamic pressure effect of the dynamic pressure generating grooves, and the shaft member 2 is rotatably supported by the pressure thereof in both the thrust directions in a non-contact manner. With this, there are formed a first thrust bearing portion T1 and a second thrust bearing portion T2 for rotatably supporting the shaft member 2 in both the thrust directions in a non-contact manner.

Further, during rotation of the shaft member 2, the seal space S exhibits a tapered configuration gradually diminished toward the inside of the housing 7 as described above. Therefore, owing to drawing-in action caused by a capillary force, a lubricant oil in the seal space S is drawn in a direction in which the seal space is narrowed, that is, drawn toward the inside of the housing 7. As a result, it is possible to effectively prevent leakage of the lubricant oil from the inside of the housing 7.

Further, as described above, the upper dynamic pressure generating grooves 8a1 are formed asymmetrically in the axial direction with respect to the axial center m, and the axial dimension X1 of the upper region with respect to the axial center m is larger than the axial dimension X2 of the lower region. Thus, during rotation of the shaft member 2, a drawing-in force (pumping force) to the lubricant oil due to the dynamic pressure generating grooves 8a1 is relatively large in the upper region as compared with the lower region. In this context, owing to differential pressure of the drawing-in force, the lubricating oil filling the gap between the inner peripheral surface 8a of the bearing sleeve 8 and the outer peripheral surface 21a of the shaft portion 21 flows downward. Then, the lubricating oil circulates in a route constituted by the following: the gap between the lower end surface 8b of the bearing sleeve 8 and the upper end surface 22a of the flange portion 22; a fluid path constituted by the axial groove 8c1 of the bearing sleeve 8; a fluid path constituted by the radial groove 10b1 of the seal member 10; and a fluid path constituted by the annular groove 8d1 and the radial groove 8d2 of the bearing sleeve 8. After that, the lubricating oil is re-drawn into the radial bearing gap of the first radial bearing portion R1.

In this way, the lubricant oil flows and circulates through the inner spaces of the housing 7, whereby it is possible to maintain the balance in pressures of the lubricant oil, making it possible to solve the problems such as generation of bubbles due to generation of local negative pressure, and occurrence of lubricant oil leakage and generation of vibration due to generation of bubbles. The above-mentioned circulation route communicates with the seal space S1, and hence, even when bubbles are allowed to be mixed into the lubricant oil for some reason or other, such bubbles are discharged into the atmosphere via the oil surfaces (gas/liquid interfaces) of the lubricant oil in the seal space S when the bubbles circulate with the lubricant oil. Accordingly, the adverse effect of the bubbles can be prevented even more effectively.

In the following, detailed description is made of a manufacturing method for the shaft member 2.

Figure 4:
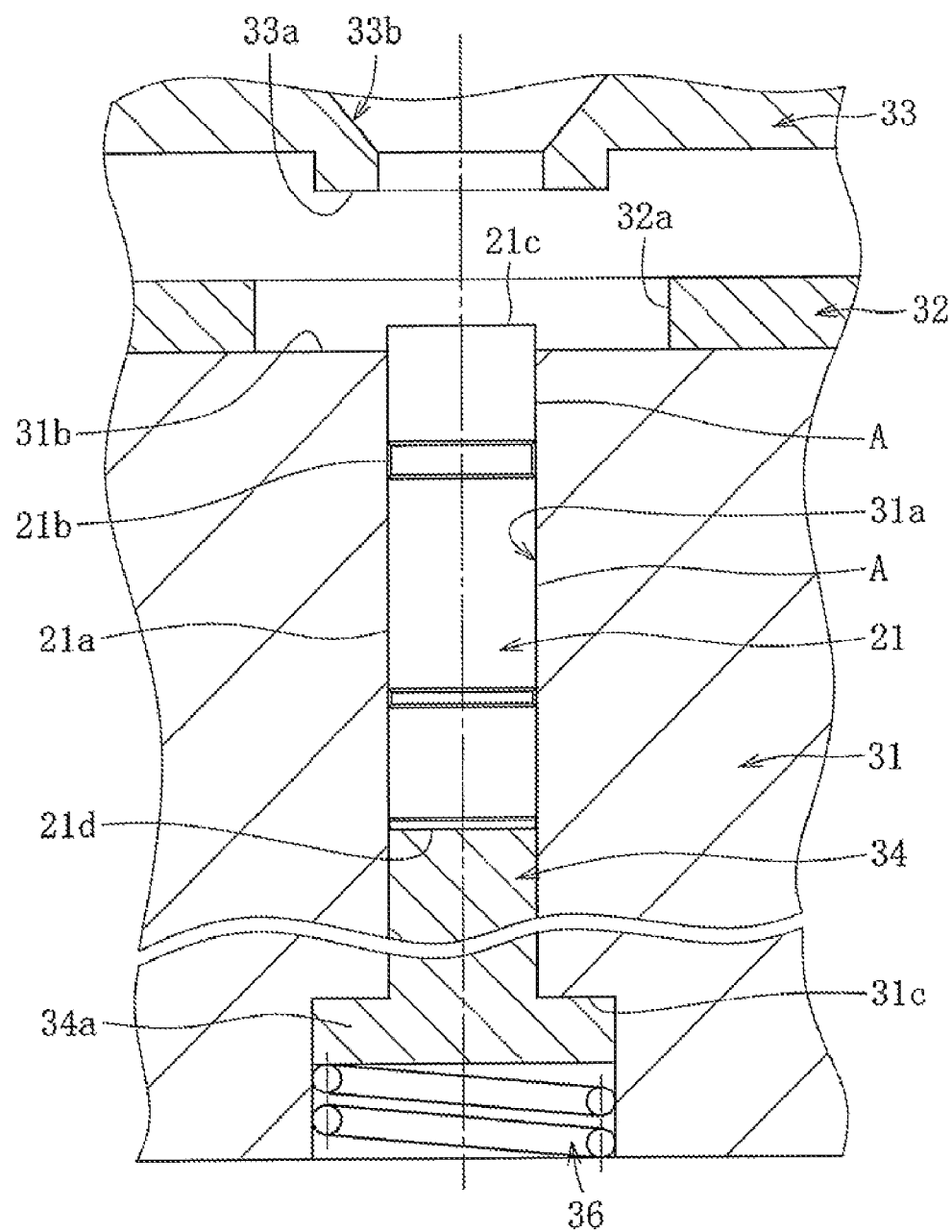
FIG. 4 is a sectional view conceptually illustrating a manufacturing step of the shaft member illustrated in FIG. 2.
Figure 5:
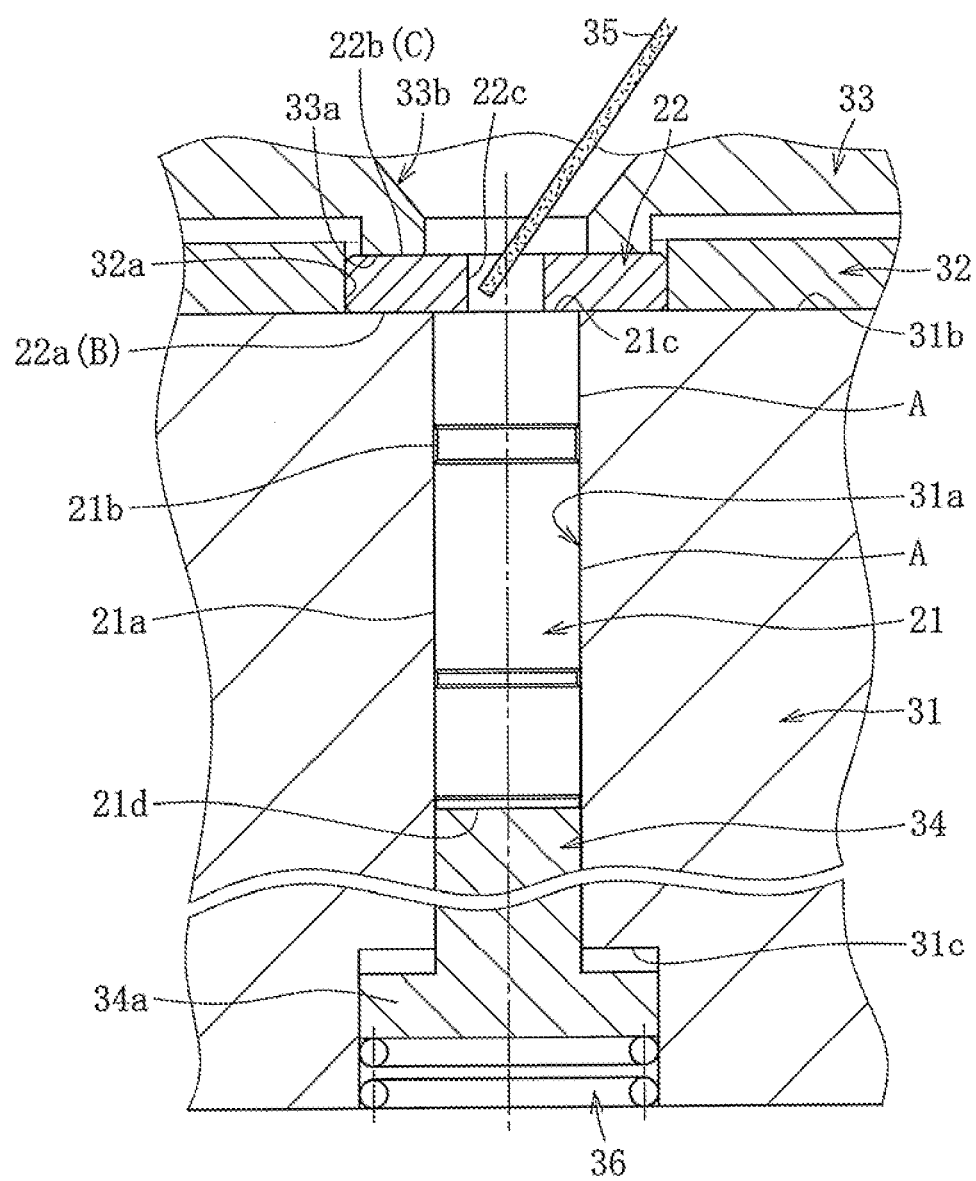
FIG. 5 is another sectional view conceptually illustrating the manufacturing step of the shaft member illustrated in FIG. 2.

FIGS. 4 to 6 are main-part enlarged sectional views illustrating a manufacturing step of the shaft member 2, more specifically, a step of laser-welding the shaft portion 21 and the flange portion 22 with each other. A manufacturing apparatus illustrated in FIGS. 4 and 5 includes a main part constituted by a lower die 31 fixed onto a base with bolts or the like, a middle die 32 and an upper die 33 which are arranged above the lower die 31 so as to be movable relative to the lower die 31 by an appropriate driving means, and a laser irradiation device (not shown) for applying a laser beam 35. On an inner periphery of the lower die 31, there are arranged a shaft support member 34 for supporting an upper end surface 21d of the shaft portion 21 and an elastic member 36 constituted by an elastic member such as a spring. The shaft support member 34 is elastically supported at a lower end thereof by the elastic member 36 so as to be slidable relative to the lower die 31 in the axial direction. The shaft support member 34 includes a lip portion 34a provided at a lower end thereof so as to project to the radially outer side. In a state in which each of the dies 31 to 33 is positioned at original position as illustrated in FIG. 4, the lip portion 34a is engaged with a step surface 31c provided below the lower die 31, and upward displacement is regulated.

The lower die 31 includes a retention hole 31a for retaining the shaft portion 21. The retention hole 31a is set to have an inner diameter dimension by which backlashes of the shaft portion 21 do not occur and the radial bearing surface A is not damaged, in other words, by which the shaft portion 21 is allowed to be lightly press-fitted. In a state illustrated in FIG. 4, an axial dimension of the retention hole 31a (clearance between an upper end surface 31b of the lower die 31 and an upper end surface of the shaft support member 34) is set to a dimension smaller by a predetermined amount than the dimension of the entire length of the shaft portion 21. Accordingly, as illustrated also in FIG. 4, when the shaft portion 21 is inserted into the retention hole 31a, the shaft portion 21 is restricted in the radial direction and the lower end surface 21c thereof protrudes upward relative to the upper end surface 31b of the lower die 31 by a predetermined amount.

The middle die 32 is formed in an annular shape, and restricts an outer peripheral surface of the flange portion 22 with an inner peripheral surface 32a thereof. With this, radial movement of the flange portion 22 is regulated.

The upper die 33 includes a restricting surface 33a for restricting both the end surfaces of the flange portion 22 in cooperation with the upper end surface 31b of the lower die 31 and a through-hole 33b serving as an entrance of the laser beam 35. In this case, as is apparent also from FIG. 5, a width of the restricting surface 33a is set to be smaller by a predetermined amount than a width of the lower end surface 22b of the flange portion 22. This is because, when the entire of the lower end surface 22b of the flange portion 22 is pressed with the restricting surface 33a of the upper die 33, the lower end surface 22b of the flange portion 22 may conform to the restricting surface 33a of the upper die 33, with the result that fixation accuracy of the shaft portion 21 and the flange portion 22 may be deteriorated.

Incidentally, in this type of the shaft member with a flange, perpendicularity of the upper end surface 22a (thrust bearing surface B) of the flange portion 22 with respect to the outer peripheral surface 21a (radial bearing surface A) of the shaft portion 21 has a significant influence on bearing performance. Thus, in order to secure predetermined perpendicularity between those bearing surfaces, perpendicularity of the upper end surface 31b with respect to (the inner wall surface of) the retention hole 31a of the lower die 31 is set to be sufficiently increased.

As the laser irradiation device, there may be given ones applying various well-known laser beams such as a YAG laser, a carbon-dioxide gas laser, a semiconductor laser beam, and a fiber laser beam. In those laser beams, in consideration of beam quality and economy of the laser beam 35 to be applied, and welding strength and easiness of welding, it is suitable to use the YAG laser or the carbon-dioxide gas laser. The laser beam 35 may be applied in any of a continuous mode and a pulse mode.

Note that, while not shown, it is also possible to arrange a laser-beam-diameter controlling means including a concave lens and a convex lens for controlling a laser beam diameter of the laser beam 35 between the laser irradiation device and the upper die 33, for example. Further, while not shown as well, in order to prevent occurrence of oxidization near the welded portion 23 during welding operation, it is desirable to arrange a shielding-gas spraying device for spraying an inert gas such as an argon gas and a nitrogen gas for blocking ambient air.

In the device structured as described above, first, as illustrated in FIG. 4, the shaft portion 21 is inserted into the retention hole 31a of the lower die 31. Next, as illustrated in FIG. 5, the flange portion 22 is placed on the lower end surface 21c of the shaft portion 21, and after that, the upper die 33 is moved downward so as to bring the restricting surface 33a of the upper die 33 into contact with the lower end surface 22b of the flange portion 22. When the upper die 33 is further moved downward so as to bring the upper end surface 22a of the flange portion 22 into contact with the lower end surface 21c of the shaft portion 21, both the end surfaces 22a and 22b of the flange portion 22 are restricted with the restricting surface 33a of the upper die 33 and the upper end surface 31b of the lower die 31, respectively. In this case, as a result of compressive deformation of the elastic member 36, the lower end surface 21c of the shaft portion 21 is brought into contact with the upper end surface 22a of the flange portion 22 at an appropriate pressing force. Note that, as described above, predetermined perpendicularity is secured between the inner peripheral surface of the lower die 31 (inner wall surface of the retention hole 31a) and the upper end surface 31b. Thus, when accuracy of each of the lower end surface 21c of the shaft portion 21 and the upper end surface 22a of the flange portion 22 is set to be sufficiently high, at a time point when the upper end surface 22a of the flange portion 22 is brought into contact with the lower end surface 21c of the shaft portion 21, predetermined perpendicularity is secured between the radial bearing surface A of the shaft portion 21 and the thrust bearing surface B of the flange portion 22.

In parallel with the restriction (or after the restriction) of both the end surfaces 22a and 22b of the flange portion 22 with the upper end surface 31b of the lower die 31 and the restricting surface 33a of the upper die 33, the outer peripheral surface of the flange portion 22 is restricted with the inner peripheral surface 32a of the middle die 32. With this, the flange portion 22 is restricted in movement in both the axial direction and the radial direction. Note that, after the restriction of the flange portion 22, the dies 31 to 33 are fixed together with fixing bolts or the like (not shown) so as not to move during welding.

Figure 6A:
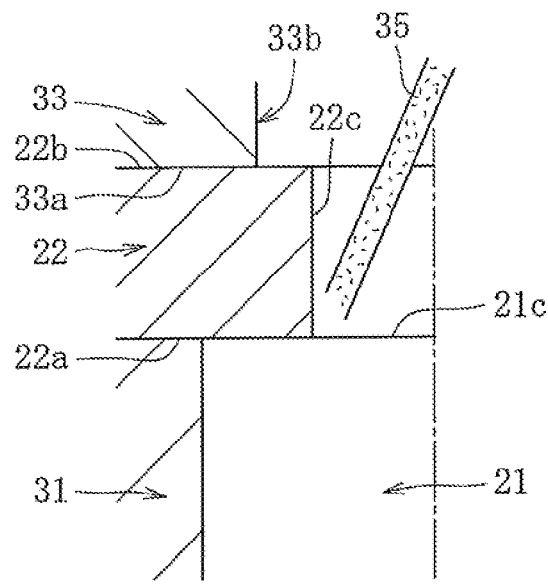
FIG. 6A is a main-part enlarged sectional view of FIG. 5.
Figure 6B:
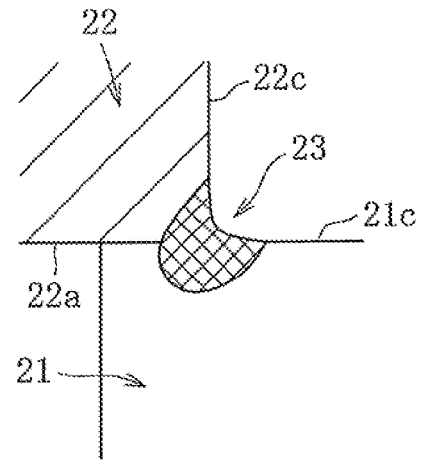
FIG. 6B is a main-part enlarged sectional view of the shaft member after a welded portion is formed.

Then, as illustrated also in FIGS. 5 and 6A, the laser beam 35 is applied from the laser irradiation device (not shown) to an inner periphery of the upper end of the flange portion 22 so as to pass through the through-hole 33b of the upper die 33 and the hole of the flange portion 22. When the laser beam 35 is applied in this mode, the inner periphery of the upper end of the flange portion 22 and the lower end of the shaft portion 21 adjacent thereto are welded and bonded to each other. As illustrated in FIG. 6B, the welded portion 23 is formed by fixing the flange portion 22 to the lower end surface 21c of the shaft portion 21 by welding. Note that, in this embodiment, by continuous application of the laser beam 35 in the circumferential direction, the welded portion 23 is formed over the entire of the inner periphery of the flange portion 22.

Then, after formation of the welded portion 23 by a predetermined amount, the upper die 33 and the middle die 32 are restored to the original positions and the shaft portion 21 is taken out from the retention hole 31a of the lower die 31. In this manner, the shaft member 2 as a finished product illustrated in FIG. 2 is obtained.

As described above, when the welded portion 23 is formed on the inner periphery of the upper end of the annular flange portion 22 so as to fix the shaft portion 21 and the flange portion 22 to each other, it is possible to reliably prevent molten matters such as metal particles generated at the time of welding from being dispersed and adhering to the outer peripheral surface 21a (radial bearing surface A) of the shaft portion 21 and the upper end surface 22a (thrust bearing surface B) of the flange portion 22, the outer peripheral surface 21a constituting one of the surfaces which form the radial bearing gap, the upper end surface 22a constituting one of the surfaces which form the thrust bearing gap of the first thrust bearing portion T1. Further, it is possible to prevent as much as possible the molten matters from adhering to the lower end surface 22b (thrust bearing surface C) of the flange portion 22, the lower end surface 22b constituting one of the surfaces which form the thrust bearing gap of the second thrust bearing portion T2. In addition, the welded portion 23 is formed on the inner periphery of the flange portion 22, and hence the formation mode thereof does not have any influence on the accuracy of the bearing gaps (radial bearing gaps and thrust bearing gaps). Accordingly, without performing additional finish-processing after welding, it is possible to manufacture a shaft member 2 excellent in both accuracy and strength at low cost.

When the flange portion 22 is formed in an annular shape as described above, it is also possible to fit one end of the shaft portion 21 to the inner periphery of the flange portion 22 and then the fitting portion therebetween is welded. However, in such a structure, perpendicularity of the shaft portion 21 and the flange portion 22 after welding depends on processing accuracy of the fitting surface (outer peripheral surface 21a of the shaft portion 21 and the inner peripheral surface 22c of the flange portion 22). Thus, it is necessary to finish the outer peripheral surface 21a of the shaft portion 21 and the inner peripheral surface 22c of the flange portion 22 with high accuracy in advance, which leads to an increase in processing cost. In contrast, as in the present invention, when the shaft portion 21 and the flange portion 22 are bonded to each other in a state of end-surface contact in which the end surface 21c and the upper end surface 22a of thereof are held in contact with each other, the perpendicularity between the shaft portion 21 and the flange portion 22 can be controlled with the dies 31 to 33 used at the time of welding. Thus, it is possible to suppress an increase in processing cost.

Further, the disk hub 3 (refer to FIG. 1) is fixed to the upper end of the shaft portion 21 at the time of assembling a motor. When fastening strength between the shaft portion 21 and the flange portion 22 is insufficient in this case, the shaft portion 21 and the flange portion 22 may be separated from each other owing to a pressing force at the time of fixing the disk hub 3. In order to avoid such a failure in the structure in which the lower end of the shaft portion 21 is fitted to the inner periphery of the flange portion 22 and the fitting portion therebetween is welded, it is necessary to form welded portions on both the end portions of the hole of the flange portion 22, which requires much time and effort for welding operation. In contrast, as in the present invention, when the shaft portion 21 and the flange portion 22 are welded to each other in the state of end-surface contact (state of being engaged with each other in the axial direction), the lower end surface 21c of the shaft portion 21 is engaged with the upper end surface 22a of the flange portion 22 in the axial direction so as to resist the pressing force at the time of fixation of the disk hub 3. Accordingly, it is sufficient that the welded portion 23 is formed only at one point in the axial direction. Also in this regard, it is possible to suppress the increase in processing cost.

Further, when the shaft portion 21 is fitted to the inner periphery of the flange portion 22, it is necessary to correspondingly increase the dimension of the entire length of the shaft portion 21, which leads to an increase in material cost of the shaft member 2 and an increase in weight of the shaft member 2. In contrast, as in the present invention, when the shaft portion 21 and the flange portion 22 are welded to each other in the state of end-surface contact, it is possible to secure entire length dimension required as that of the shaft member 2 even when the entire length of the shaft portion 21 is reduced. Accordingly, it is possible to achieve reduction in material cost and weight of the shaft member 2, which contributes to higher rotational accuracy and higher speed rotation of the fluid dynamic bearing device 1.

Further, the welded portion 23 is formed by application of the laser beam 35, and hence the welded portion 23 can be formed finely with high accuracy. In particular, in this embodiment, the welded portion 23 is formed by application of the laser beam 35 in the state in which both the end surfaces 22a and 22b of the flange portion 22 are restricted. Thus, it is possible to effectively prevent occurrence of deformation of the flange portion 22, such as warpage due to thermal influence of the application of the laser beam 35.

In this embodiment, both the shaft portion 21 and the flange portion 22 are formed of stainless steel. With laser welding, it is possible to secure high fastening strength even between different metals. Thus, as long as characteristics required for the shaft member 2 (strength and the like) can be satisfied, the shaft portion 21 and the flange portion 22 may be formed of materials different from each other. For example, the shaft portion 21 may be formed of stainless steel, and the flange portion 22 may be formed of brass or the like.

Note that, although the welded portion 23 is formed over the entire circumference of the inner periphery of the flange portion 22 as described above in this embodiment, it is unnecessary to form the welded portion 23 over the entire circumference as long as predetermined fastening strength can be secured between the shaft portion 21 and the flange portion 22. Instead, the welded portion 23 may be intermittently formed in the circumferential direction. With this, it is possible to further reduce the risk of deformation of the flange portion 22 due to thermal influence at the time of application of the laser beam 35.

Figure 7A:
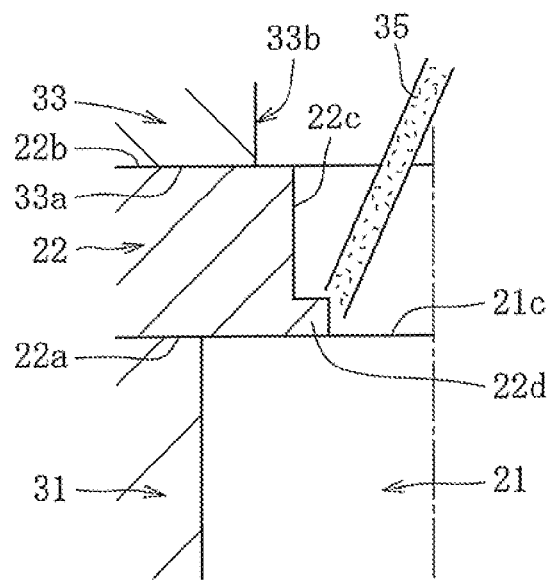
FIG. 7A is an enlarged sectional view of the main part in FIG. 5 in a case where a flange portion having another structure is used.

Although description is made hereinabove of a structure of using the flange portion 22 having the inner diameter dimension uniform over the entire length thereof, the mode of the flange portion 22 is not limited thereto. For example, as illustrated in FIG. 7A, in the flange portion 22, an annular protrusion 22d protruding to the radially inner side may be provided on the upper end portion (end portion on a side of the shaft portion 21) of the inner peripheral surface 22c. The protrusion 22d is provided so as to be flush with the upper end surface 22a of the flange portion 22 such that the upper end surface of the protrusion 22d (end surface on a side of the shaft portion 21) is brought into contact with the lower end surface 21c of the shaft portion 21 in a state in which the upper end surface 22a of the flange portion 22 is held in contact with the lower end surface 21c of the shaft portion 21.

Figure 7B:
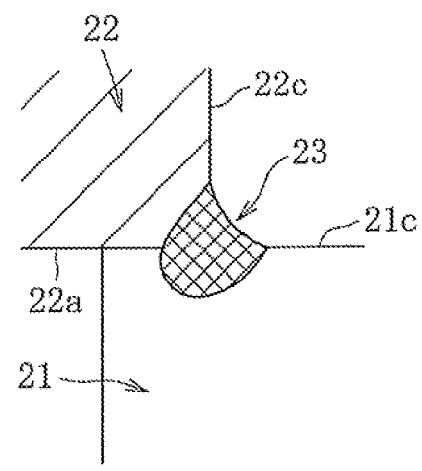
FIG. 7B is a main-part enlarged sectional view of the shaft member after a welded portion is formed in a case where a flange portion illustrated in FIG. 7A is used.

When the flange portion 22 structured as described above is used, as illustrated in FIGS. 7A and 7B, the welded portion 23 may be formed by applying the laser beam 35 to the protrusion 22d. With this, the melting range of the inner peripheral surface 22c of the flange portion 22 is limited, and hence it is possible to suppress the thermal influence to the flange portion 22 to the minimum, and to prevent the deformation thereof more effectively.

Note that, the size of the protrusion 22d has a direct influence on the size of the welded portion 23 to be formed, that is, welding strength between the shaft portion 21 and the flange portion 22. When the size of the protrusion 22d is excessively large, molten matters such as metal particles generated at the time of application of the laser beam 35 may be dispersed and adhere to the lower end surface 22b of the flange portion 22. When the size of the protrusion 22d is excessively small, desired fastening strength (welding strength) may not be secured. Thus, it is sufficient that the size of the protrusion 22d is appropriately set in accordance with required quality as long as the above-mentioned problems are not involved. The protrusion 22d is integrally formed simultaneously with molding of the flange portion 22 by pressing or forging.

Description is made hereinabove of the fluid dynamic bearing device according to an embodiment of the present invention, the fluid dynamic bearing device adopting a first structure of the present invention. In this context, the first structure of the present invention is applicable not only to the fluid dynamic bearing device described above. In the following, description is made on a fluid dynamic bearing device according to another embodiment of the present invention, the fluid dynamic bearing device adopting the first structure of the present invention. In the following, the components similar to those described above are denoted by the same reference symbols, and redundant description thereof is omitted.

Figure 8:
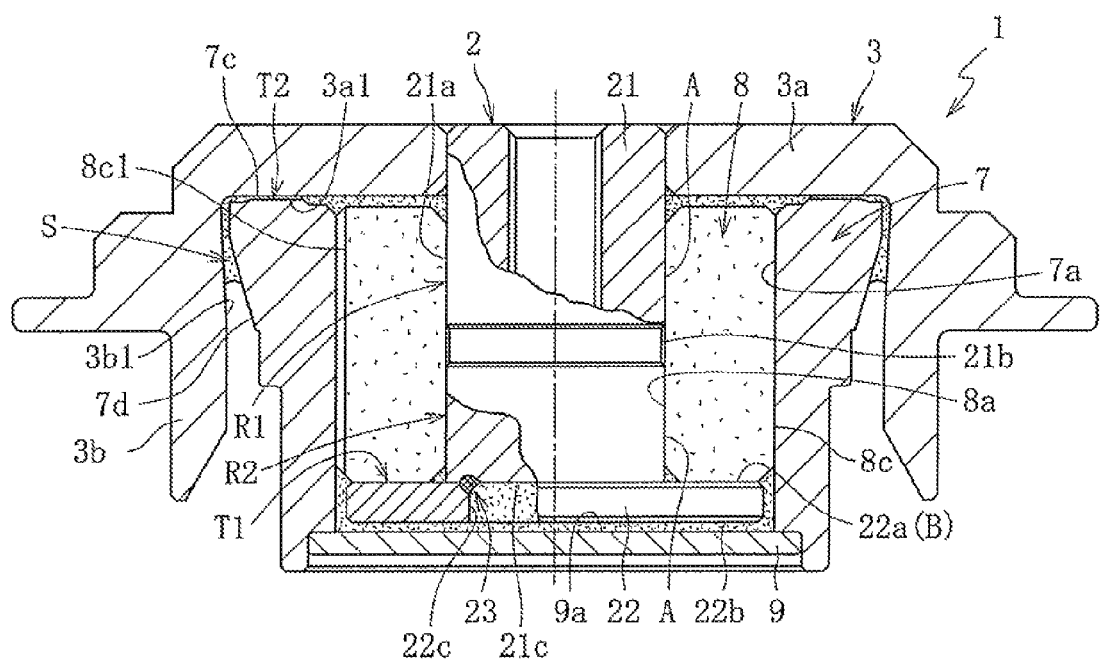
FIG. 8 is a sectional view of a fluid dynamic bearing device according to a second embodiment of the present invention, the fluid dynamic bearing device adopting the first structure of the present invention.

FIG. 8 illustrates a fluid dynamic bearing device 1 according to a second embodiment of the present invention, the fluid dynamic bearing device 1 adopting the first structure of the present invention. The fluid dynamic bearing device 1 illustrated in FIG. 8 is different from that illustrated in FIG. 2 in the following points: the thrust bearing surface C is not formed on the lower end surface 22b of the flange portion 22, and the second thrust bearing portion T2 is provided between a lower end surface 3a1 of a disk portion 3a of the disk hub 3 fixed to the upper end of the shaft portion 21 and an upper end surface 7c of the housing 7; and the seal space S is provided between a tapered outer peripheral surface 7d of the housing 7 and an inner peripheral surface 3b1 of a cylindrical portion 3b of the disk hub 3.

Figure 9:
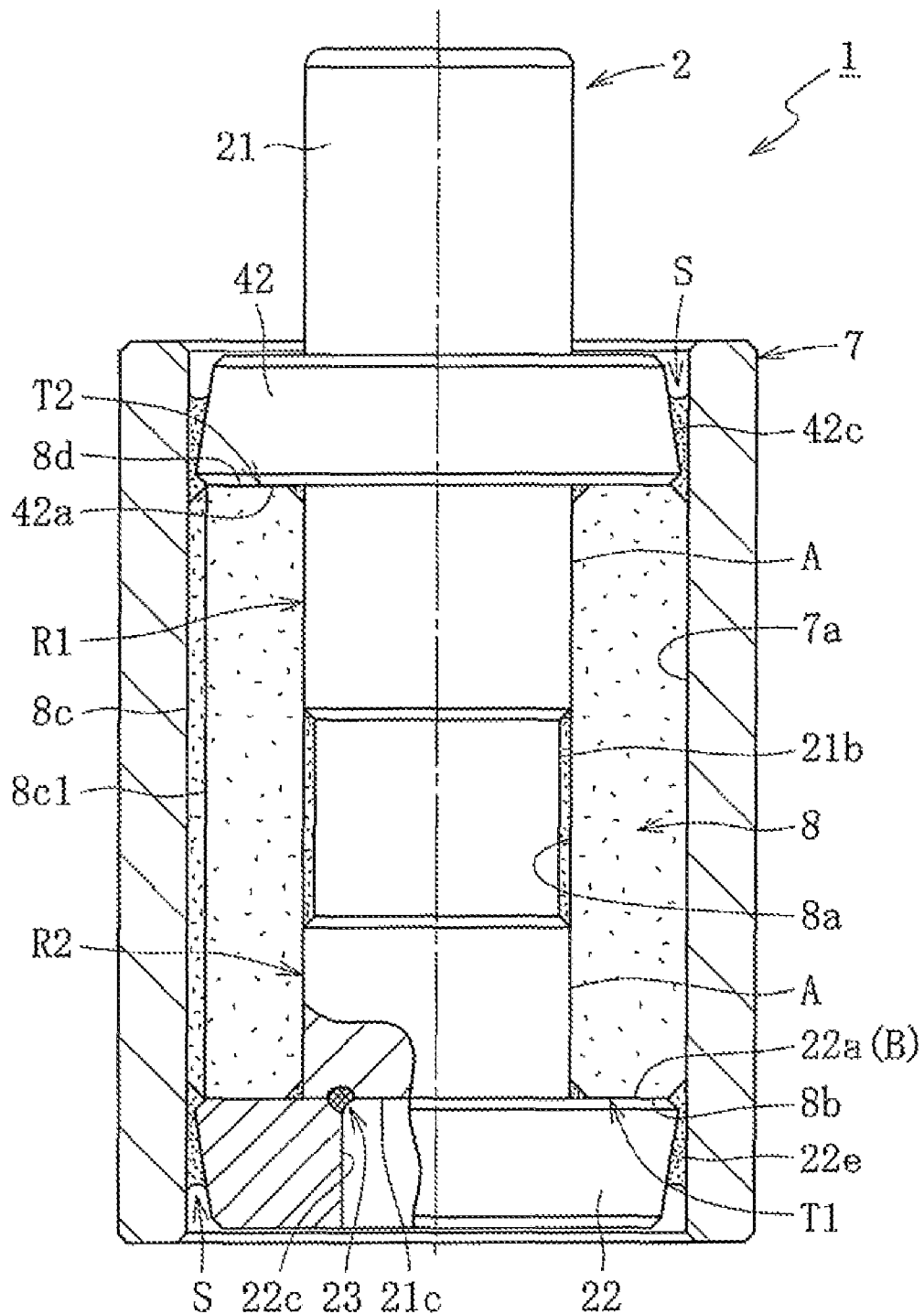
FIG. 9 is a sectional view of a fluid dynamic bearing device according to a third embodiment of the present invention, the fluid dynamic bearing device adopting the first structure of the present invention.

FIG. 9 illustrates a fluid dynamic bearing device 1 according to a third embodiment of the present invention, the fluid dynamic bearing device 1 adopting the first structure of the present invention. The fluid dynamic bearing device 1 illustrated in FIG. 9 is structurally different from that described in the above-mentioned embodiment in the following points: the shaft member 2 further includes a second flange portion 42 positioned above the bearing sleeve 8; the second thrust bearing portion T2 is provided between the second flange portion 42 and the upper end surface 8d of the bearing sleeve 8; and the seal space S is formed between outer peripheral surfaces 22e and 42e of both the flange portions 22 and 42 and the inner peripheral surface 7a of the housing 7. Even when using the shaft member 2 including the shaft portion 21 provided with the two flange portions 22 and 42 as in this case, the above-mentioned structure of the present invention is applicable to a product in which the shaft portion 21 and the flange portion 22 provided at the lower end of the shaft portion 21 are integrated with each other.

Figure 10:
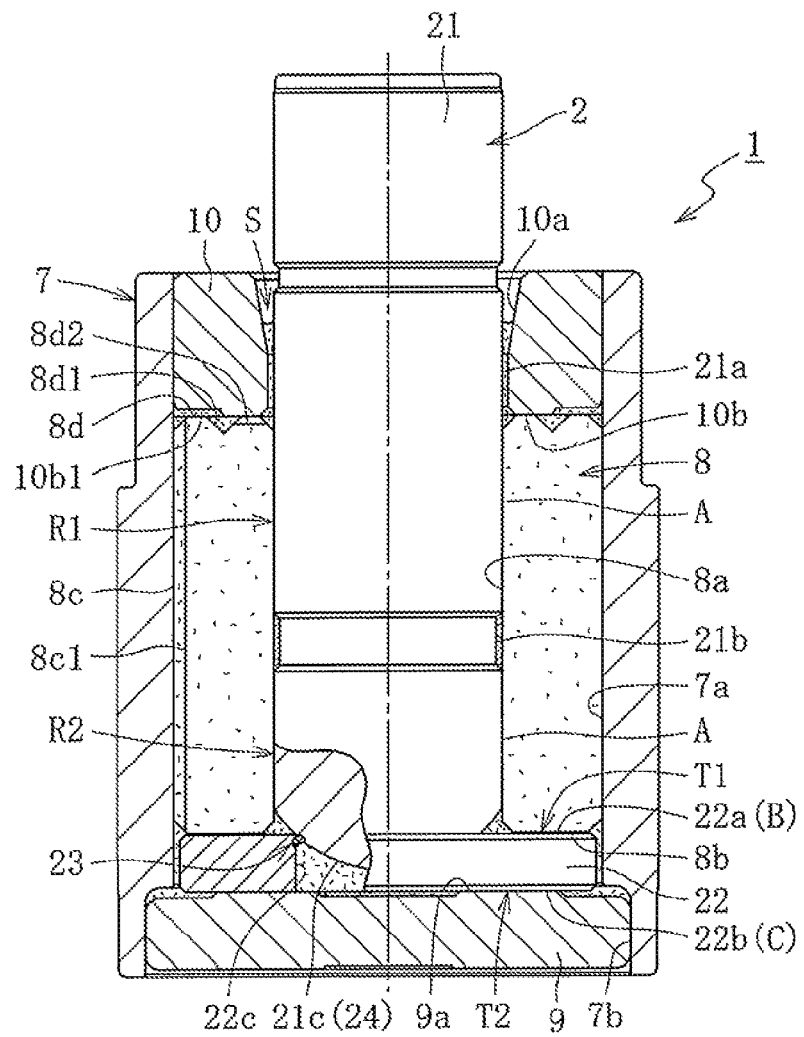
FIG. 10 is a sectional view of a fluid dynamic bearing device according to a fourth embodiment of the present invention, the fluid dynamic bearing device adopting the first structure of the present invention.

FIG. 10 illustrates a fluid dynamic bearing device 1 according to a fourth embodiment of the present invention, the fluid dynamic bearing device 1 adopting the first structure of the present invention and being described as a modification of the fluid dynamic bearing device 1 illustrated in FIG. 2. In the fluid dynamic bearing device 1 illustrated in FIG. 10, the lower end surface 21c of the shaft portion 21 constituting the shaft member 2 is formed in a convex-curved surface so as to function as an aligning surface 24. In a state in which the convex-curved surface is engaged with the upper-end inner peripheral edge portion of the flange portion 22, the shaft portion 21 and the flange portion 22 are fixed to each other through intermediation of the welded portion 23 formed on the inner periphery of the upper end of the flange portion 22. With this structure, the flange portion 22 is allowed to rock in a swinging manner with respect to the shaft portion 21. Thus, in the case of restricting the posture of the flange portion 22 with respect to the shaft portion 21 with the manufacturing apparatus (jig) as illustrated in FIGS. 4 and 5, it is possible to perform alignment between the shaft portion 21 and the flange portion 22 easily and with high accuracy, and hence to manufacture more easily the shaft member 2 excellent in both accuracy and strength.

Figure 11:
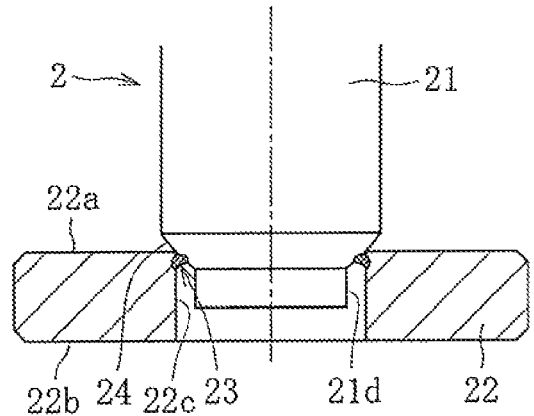
FIG. 11 is a main-part enlarged sectional view illustrating a modification of the fluid dynamic bearing device illustrated in FIG. 10.

Note that, it is not necessary to form the entire of the lower end surface 21c of the shaft portion 21 in a convex-curved shape. For example, as illustrated in FIG. 11, only a part engaged with the upper end of the hole of the flange portion 22 may be formed as a convex-curved surface. In this case, the smaller diameter portion 21d extending downward may be formed in advance at the lower end of the shaft portion 21. With this structure, it is possible to reduce the volume of the space formed on the inner periphery of the flange portion 22, and hence to reduce the amount of oil filling the inner space of the fluid dynamic bearing device 1.

Figure 12:
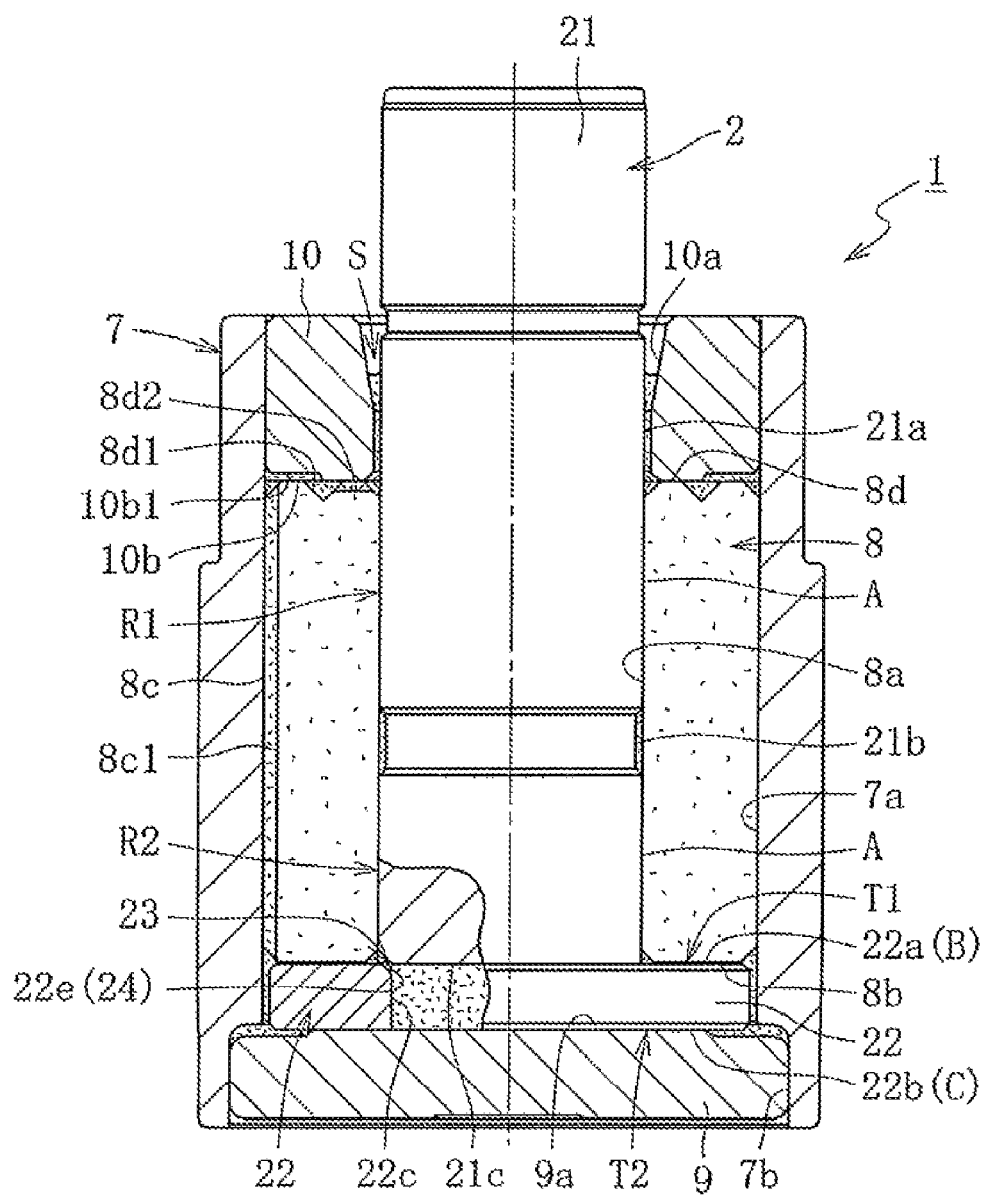
FIG. 12 is a sectional view of a fluid dynamic bearing device according to a fifth embodiment of the present invention, the fluid dynamic bearing device adopting the first structure of the present invention.

FIG. 12 illustrates a fluid dynamic bearing device 1 according to a fifth embodiment of the present invention, the fluid dynamic bearing device 1 adopting the first structure of the present invention and being described as a modification of the fluid dynamic bearing device 1 illustrated in FIG. 2. In the fluid dynamic bearing device 1 illustrated in FIG. 12, an upper-end inner peripheral edge portion 22e of the flange portion 22 is formed as a convex-curved surface so as to function as the aligning surface 24, and the welded portion 23 is formed at the upper end of the inner periphery of the flange portion 22 in a state in which the lower end of the shaft portion 21 is held in contact with the upper-end inner peripheral edge portion 22e (aligning surface 24). Also, with this structure, similarly to the embodiment illustrated in FIGS. 10 and 11, the flange portion 22 is allowed to rock in a swinging manner with respect to the shaft portion 21. Thus, in the case of restricting the posture of the flange portion 22 with respect to the shaft portion 21 with the manufacturing apparatus (jig) as illustrated in FIGS. 4 and 5, it is possible to perform alignment between the shaft portion 21 and the flange portion 22 easily and with high accuracy, and hence to manufacture more easily the shaft member 2 excellent in both accuracy and strength.

The aligning surface 24 provided on the shaft portion 21 or the flange portion 22 may be formed in a convex-curved shape or may be formed in a tapered shape gradually reduced in diameter toward the counterpart member. Further, as a matter of course, the structure in which the aligning surface 24 is provided on the shaft portion 21 or the flange portion 22 as described above is also applicable to the fluid dynamic bearing devices 1 (shaft members 2) illustrated in FIGS. 8 and 9. Further, as a matter of course, it is also possible to fix, by welding, the flange portion 22 having the protrusion 22d formed on the upper-end inner periphery thereof illustrated in FIG. 7A with respect to the aligning surface 24 of the shaft portion 21 (all of which are not shown).

Figure 13:
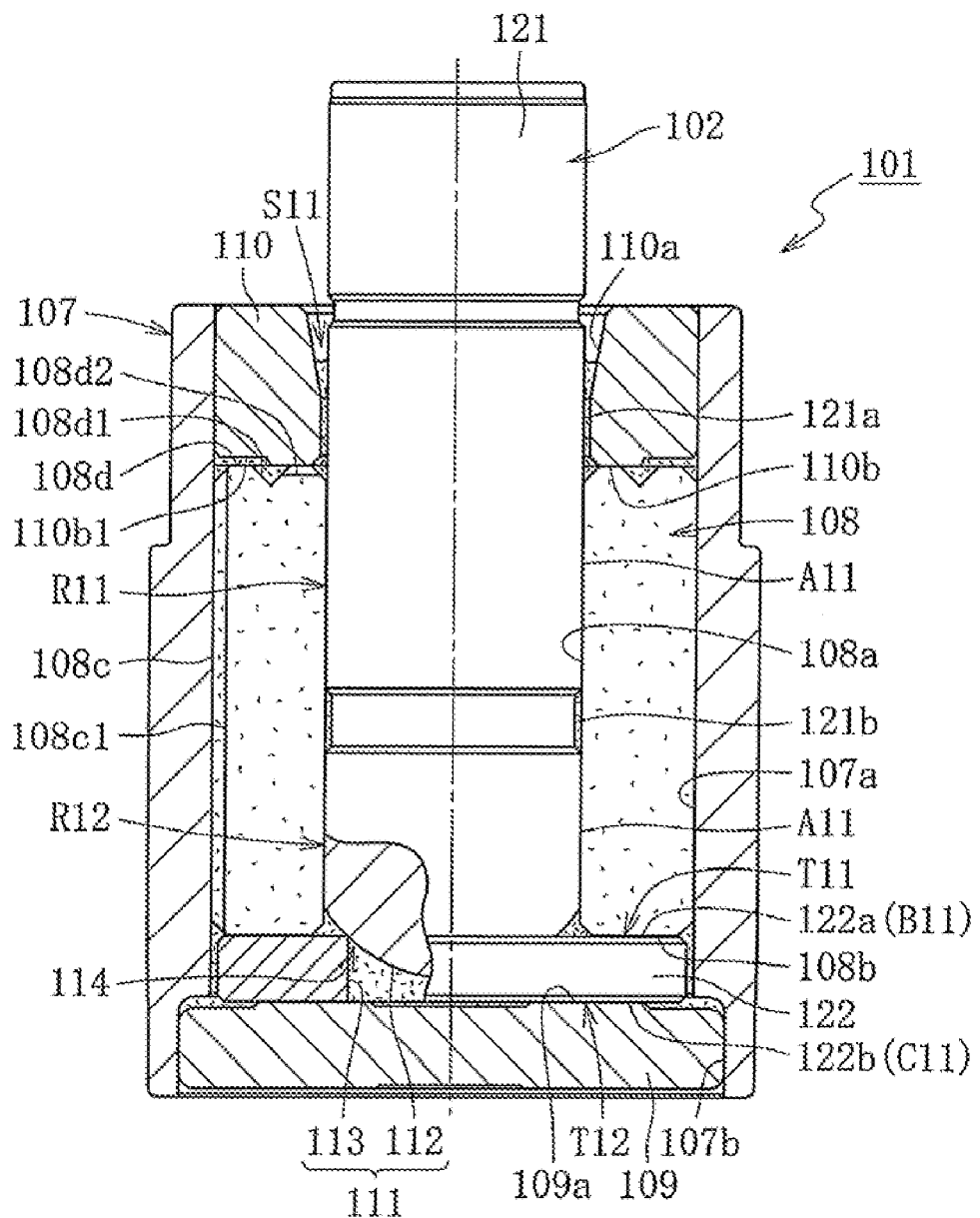
FIG. 13 is a sectional view of a fluid dynamic bearing device according to a first embodiment of the present invention, the fluid dynamic bearing device adopting a second structure of the present invention.

FIG. 13 illustrates a fluid dynamic bearing device 101 according to a first embodiment of the present invention, the fluid dynamic bearing device 101 adopting the second structure of the present invention. The fluid dynamic bearing device 101 illustrated in FIG. 13 includes a bearing sleeve 108, a shaft member 102 inserted along an inner periphery of the bearing sleeve 108, a housing 107 for accommodating the bearing sleeve 108 and the shaft member 102 on an inner periphery thereof, a lid member 109 for sealing an opening at one end of the housing 107, and a seal member 110 for sealing an opening at another end of the housing 107. Note that, for the sake of convenience in description, the following description is made on the premise that the side of the seal member 110 is an upper side and the side opposite thereto in the axial direction is a lower side.

The housing 107 is formed in a cylindrical shape with use of a metal material such as brass or a resin material. An inner peripheral surface of the housing 107 is partitioned into a smaller-diameter inner peripheral surface 107a and a larger-diameter inner peripheral surface 107b which are relatively smaller and relatively larger in the axial direction, respectively. The bearing sleeve 108 and the lid member 109 are fixed to the smaller-diameter inner peripheral surface 107a and the larger-diameter inner peripheral surface 107b by an appropriate means such as bonding, press-fitting, and welding, respectively.

The bearing sleeve 108 is formed of in a cylindrical shape of a porous body formed of a sintered metal containing copper as a main component. The bearing sleeve 108 may be formed of a soft metal other than the sintered metal, such as brass, or may be formed of a porous body other than that of the sintered metal (a porous resin, for example).

Figure 14A:
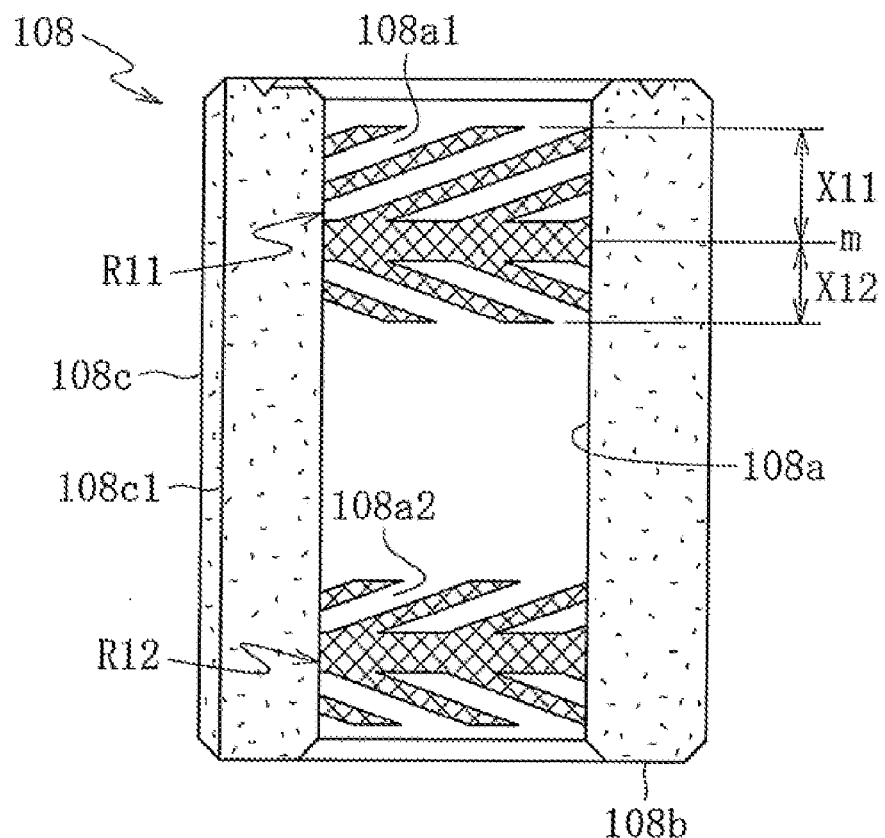
FIG. 14A is a sectional view of a bearing sleeve illustrated in FIG. 13.

As illustrated in FIG. 14A, separately from each other at two portions in the upper and lower direction on an inner peripheral surface 108a of the bearing sleeve 108, there are formed, as radial dynamic pressure generating portions, regions in which a plurality of dynamic pressure generating grooves 108a1 and 108a2 are arranged in a herringbone pattern. In this embodiment, upper dynamic pressure generating grooves 108a1 are formed asymmetrically with each other in the axial direction with respect to an axial center m (axial center of a region between the upper and lower inclined grooves), and an axial dimension X11 of an upper region with respect to the axial center m is larger than an axial dimension X12 of a lower region. Meanwhile, the lower dynamic pressure generating grooves 108a2 are formed symmetrically with each other in the axial direction, and axial dimensions of the upper and lower regions are equal to the axial dimension X12 described above, respectively. Note that, the dynamic pressure generating grooves may be formed in a radial bearing surface A11 of a shaft portion 121 described later, and may be formed in another well-known pattern such as a spiral pattern.

Figure 14B:
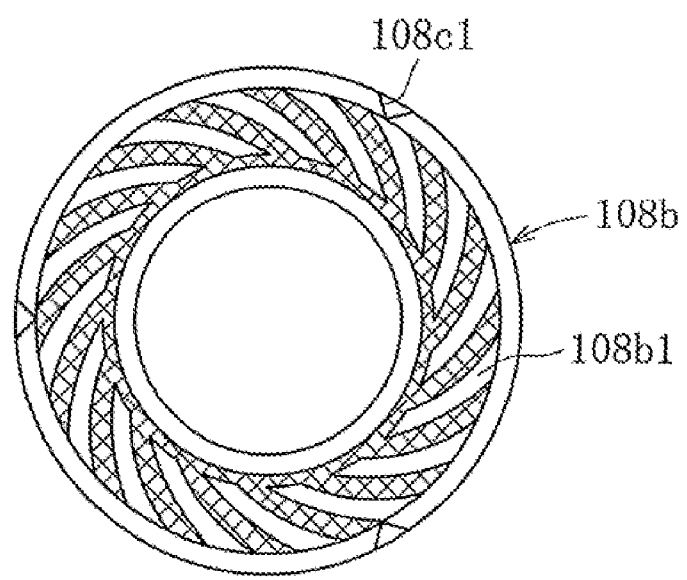
FIG. 14B is a view of a lower end surface of the bearing sleeve illustrated in FIG. 13.

As illustrated in FIG. 14B, on a lower end surface 108b of the bearing sleeve 108, there is formed, as a thrust dynamic pressure generating portion, an annular region in which a plurality of dynamic pressure generating grooves 108b1 are arranged in a spiral pattern. Note that, the dynamic pressure generating grooves (thrust dynamic pressure generating portion) may be formed in a thrust bearing surface B11 of a flange portion 122 described later, and may be formed in another well-known pattern such as a herringbone pattern.

In an outer peripheral surface 108c of the bearing sleeve 108, there are formed one or a plurality of axial grooves 108c1 opening in both end surfaces. Further, in an upper end surface 108d of the bearing sleeve 108, there are formed an annular groove 108d1 and one or a plurality of radial grooves 108d2 connected to a radially inner side of the annular groove 108d1.

The lid member 109 is formed in a disk-like shape with use of, for example, a metal material or a resin material. While not shown, on an upper end surface 109a of the lid member 109, there is formed, as a thrust dynamic pressure generating portion, an annular region in which a plurality of dynamic pressure generating grooves are arranged in a spiral pattern or a herringbone pattern. The dynamic pressure generating grooves may be formed in a thrust bearing surface C11 of the flange portion 122 described later.

The seal member 110 is formed in a ring shape with use of, for example, a soft metal material such as brass, another metal material, or a resin material, and is fixed to an upper end portion of the inner peripheral surface 107a of the housing 107 by an appropriate means such as bonding and press-fitting. Between an inner peripheral surface 110a of the seal member 110 and an outer peripheral surface 121a of the shaft portion 121, the predetermined seal space S11 is formed so as to have a predetermined volume. The seal space S11 has a buffering function of absorbing an amount of change in volume in accordance with change in temperature of a lubricating oil filling the fluid dynamic bearing device 101. An oil surface of the lubricating oil is constantly maintained with a range of the seal space S11 within an expected range of change in temperature.

The shaft member 102 includes the shaft portion 121 and the flange portion 22 protruding to a radially outer side of the shaft portion 121. The shaft portion 121 and the flange portion 122 are formed of a metal material, that is, stainless steel in this embodiment. Separately from each other at two portions in the axial direction on the outer peripheral surface 121a of the shaft portion 121, there are formed radial bearing surfaces A11 and A11 having a shape of a flat and smooth cylindrical surface and facing, in a radial direction, the regions which are provided on the inner peripheral surface 108a of the bearing sleeve 108 and in which the dynamic pressure generating grooves 108a1 and 108a2 are formed. Between both the radial bearing surfaces A11 and A11, there is formed a grooved portion 121b radially smaller than the radial bearing surfaces A11.

On an upper end surface 122a of the flange portion 122, the thrust bearing surface B11 is provided so as to face, in the thrust direction, the region which is provided on the lower end surface 108b of the bearing sleeve 108 and in which the dynamic pressure generating grooves 108b1 are formed. Further, on a lower end surface 122b thereof, the thrust bearing surface C11 is provided so as to face, in the thrust direction, the region which is provided on upper end surface 109a of the lid member 109 and in which the dynamic pressure generating grooves are formed. Both the thrust bearing surfaces B11 and C11 are flat and smooth surfaces without the dynamic pressure generating grooves or the like.

The shaft portion 121 and the flange portion 122 are fixed to each other by welding in a state in which an aligning mechanism 111 is interposed therebetween and both the shaft portion 121 and the flange portion 122 are held in linear contact with each other. In this embodiment, the aligning mechanism 111 is constituted by an aligning surface 112 having a convex-curved (spherical) shape and gradually reduced in diameter toward the flange portion 122 (lower side) formed at the lower end of the shaft portion 121, and a recessed portion 113 formed in the flange portion 122 so as to accommodate a leading end of the aligning surface 112 of the shaft portion 121. Note that, in this embodiment, the recessed portion 113 is formed as a through-hole opening in both the end surfaces 122a and 122b of the flange portion 122, and the shaft portion 121 and the flange portion 122 are fixed to each other by welding through intermediation of a welded portion 114 formed in the inside of the recessed portion 113 of the flange portion 122. Detailed description is made on a manufacturing method for the shaft member 102.

The fluid dynamic bearing device 101 includes the components described above, and the lubricating oil fills an inner space of the housing 107 sealed with the seal member 110, the inner space including inner pores of the bearing sleeve 108.

When the shaft member 102 is rotated in the fluid dynamic bearing device 101 structured as described above, radial bearing gaps are formed respectively between the regions in which the dynamic pressure generating grooves 108a1 and 108a2 are formed and the radial bearing surfaces A11 and A11 of the shaft portion 121. Then, in accordance with the rotation of the shaft member 102, oil film rigidity of oil films formed in the radial bearing gaps is increased by the dynamic pressure effect of the dynamic pressure generating grooves 108a1 and 108a2, and the shaft member 102 is rotatably supported by the pressure thereof in the radial direction in a non-contact manner. With this, separately from each other at two portions in the axial direction, there are formed radial bearing portions R11 and R12 for rotatably supporting the shaft member 102 in the radial direction in a non-contact manner.

Further, simultaneously, thrust bearing gaps are formed between the thrust bearing surface B11 of the flange portion 122 and the lower end surface 108b of the bearing sleeve 108 and between the thrust bearing surface C11 of the flange portion 122 and the upper end surface 109a of the lid member 109, respectively. Then, in accordance with the rotation of the shaft member 102, oil film rigidity of oil films formed in both the thrust bearing gaps is increased by the dynamic pressure effect of the dynamic pressure generating grooves, and the shaft member 102 is supported by the pressure thereof in both the thrust directions in a non-contact manner. With this, there are formed a first thrust bearing portion T11 and a second thrust bearing portion T12 for rotatably supporting the shaft member 102 in both the thrust directions in a non-contact manner.

Further, during rotation of the shaft member 102, the seal space S11 exhibits a tapered configuration gradually diminished toward the inside of the housing 107 as described above. Therefore, owing to drawing-in action caused by a capillary force, a lubricant oil in the seal space S11 is drawn in a direction in which the seal space is narrowed, that is, drawn toward the inside of the housing 107. With this, it is possible to effectively prevent leakage of the lubricant oil from the inside of the housing 107.

Further, as described above, the upper dynamic pressure generating grooves 108a1 are formed asymmetrically in the axial direction with respect to the axial center m, and the axial dimension X11 of the upper region with respect to the axial center m is larger than the axial dimension X12 of the lower region. Thus, during rotation of the shaft member 102, a drawing-in force (pumping force) to the lubricant oil due to the dynamic pressure generating grooves 108a1 is relatively large in the upper region as compared with the lower region. In this context, owing to differential pressure of the drawing-in force, the lubricating oil filling the gap between the inner peripheral surface 108a of the bearing sleeve 108 and the outer peripheral surface 121a of the shaft portion 121 flows downward. Then, the lubricating oil circulates in a route constituted by the following: the gap between the lower end surface 108b of the bearing sleeve 108 and the upper end surface 122a of the flange portion 122; a fluid path constituted by the axial groove 108c1 of the bearing sleeve 108; a fluid path constituted by the radial groove 110b1 of the seal member 110; and a fluid path constituted by the radial groove 108d1 of the annular groove 108d2 of the bearing sleeve 108. After that, the lubricating oil is re-drawn into the radial bearing gap of the first radial bearing portion R11.

In this way, the lubricant oil flows and circulates through the inner spaces of the housing 107, whereby it is possible to maintain the balance in pressures of the lubricant oil, making it possible to solve the problems such as generation of bubbles due to generation of local negative pressure, and occurrence of lubricant oil leakage and generation of vibration due to generation of bubbles. The above-mentioned circulation route communicates with the seal space S11, and hence, even when bubbles are allowed to be mixed into the lubricant oil for some reason or other, such bubbles are discharged into the atmosphere via the oil surfaces (gas/liquid interfaces) of the lubricant oil in the seal space S11 when the bubbles circulate with the lubricant oil. Accordingly, the adverse effect of the bubbles can be prevented even more effectively.

Next, description is made on the manufacturing method for the shaft member 102 with reference to FIG. 15.

Figure 15A:
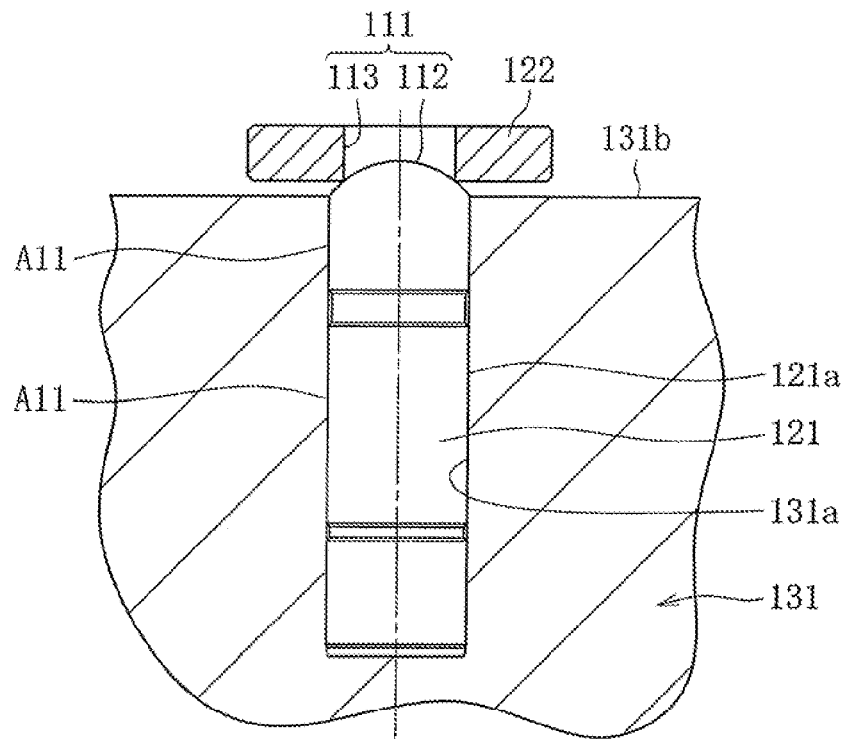
FIG. 15A is a sectional view conceptually illustrating a manufacturing step of a shaft member illustrated in FIG. 13.
Figure 15B:
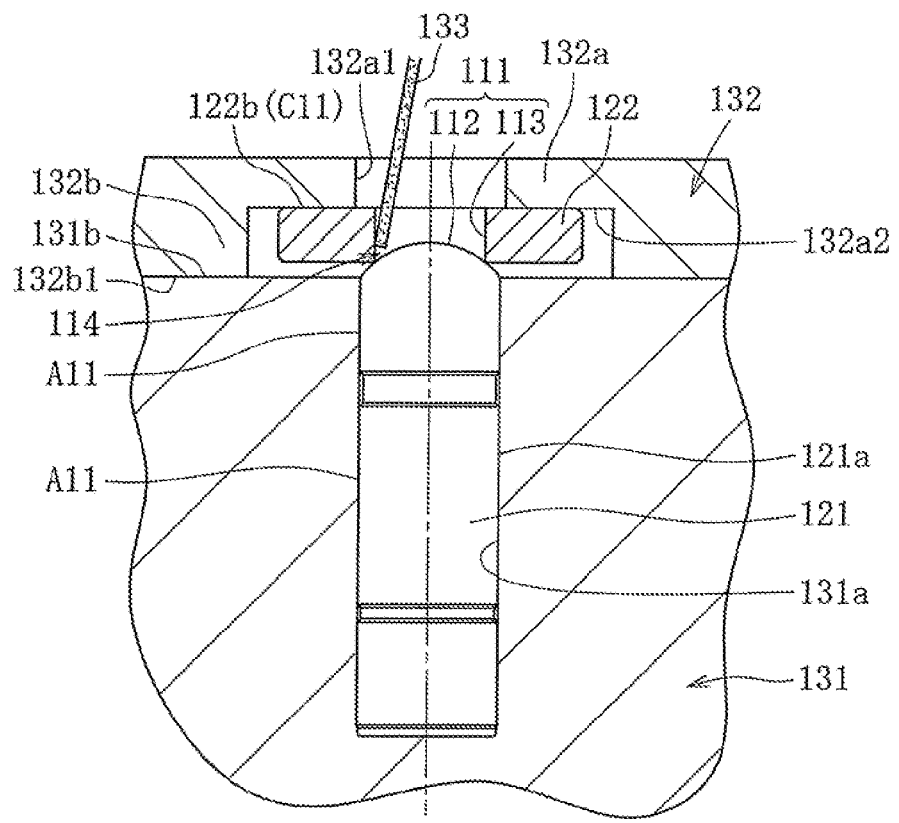
FIG. 15B is another sectional view conceptually illustrating the manufacturing step of the shaft member illustrated in FIG. 13.

FIGS. 15A and 15B conceptually illustrate the manufacturing step of the shaft member 102. The assembly apparatus illustrated in FIGS. 15A and 15B includes the following as main components: a first jig 131, a second jig 132 arranged coaxially with the first jig 131, a laser irradiation device (not shown) for applying a laser beam 133 from above the second jig 132. The first jig 131 and the second jig 132 are moved relatively to each other in the axial direction by a driving mechanism (not shown). In this embodiment, the first jig 131 is on a fixed side, and the second jig 132 is on a movable side.

The first jig 131 includes a retention hole 131a into which the shaft portion 121 can be inserted and the shaft portion 121 thus inserted is retained. The second jig 132 includes a smaller diameter portion 132a having a lower end surface 132a2 which is brought into contact with the lower end surface 122b (thrust bearing surface C11) of the flange portion 122 and a larger diameter portion 132b having an inner periphery along which the flange portion 122 is accommodated. As the laser irradiation device, there may be given ones applying well-known laser beams such as a YAG laser, a carbon-dioxide gas laser, a semiconductor laser beam, and a fiber laser beam. In consideration of beam quality and economy of the laser beam 133 to be applied, and welding strength and easiness of welding, it is suitable to use the YAG laser or the carbon-dioxide gas laser. The laser beam 133 may be applied in any of a continuous mode and a pulse mode.

Note that, while not shown, it is possible to arrange a laser-beam-diameter controlling means for controlling a laser beam diameter of the laser beam 133 between the laser irradiation device and the second jig 132. With the provision of the laser-beam-diameter controlling means, it is possible to easily control a formation range and the like of the welded portion 114 to be formed. Further, while not shown as well, in order to prevent occurrence of oxidization during welding operation near a part in which the welded portion 114 is formed, it is possible to arrange a shielding-gas spraying device for spraying an inert gas such as an argon gas and a nitrogen gas for blocking ambient air.

Incidentally, in this type of the shaft member with a flange, perpendicularity of the thrust bearing surfaces B11 and C11 of the flange portion 122 with respect to the radial bearing surface A11 of the shaft portion 121 has a significant influence on bearing performance. Thus, in order to secure predetermined perpendicularity between those bearing surfaces, it is desirable that the following and the like be sufficiently increased in advance: perpendicularity of the lower end surface 132a2 of the smaller diameter portion of the second jig 132 with respect to the inner peripheral surface of the retention hole 131a of the first jig 131; parallelism of the lower end surface 132a2 of the smaller diameter portion of the second jig 132 with respect to the upper end surface 131b of the first jig 131.

In the above-mentioned structure, first, as illustrated in FIG. 15A, the shaft portion 121 is inserted into the retention hole 131a of the first jig 131. Then, the flange portion 122 is placed on (the aligning surface 112 of) the shaft portion 121 so that the leading end portion of the aligning surface 112 provided on the shaft portion 121 is accommodated in the recessed portion 113. The aligning surface 112 provided on the shaft portion 121 is formed in a convex-curved shape. Thus, when the flange portion 122 is placed on the shaft portion 121, the flange portion 122 is allowed to rock in a swinging manner with respect to the shaft portion 121 while the flange portion 122 and the shaft portion 121 are held in a state of being held in linear contact with each other in a ring shape over the entire circumference.

Next, as illustrated in FIG. 15B, the second jig 132 is brought close to the first jig 131 so that a lower end surface 132b1 of the larger diameter portion 132b of the second jig 132 is brought into contact with the upper end surface 131b of the first jig 131. At the time of bringing the second jig 132 close to the first jig 131, when the lower end surface 132a2 of the smaller diameter portion of the second jig 132 is brought close to the lower end surface 122b of the flange portion 122, the flange portion 122 rocks on the aligning surface 112 of the shaft portion 121, with the result that the flange portion 122 with respect to the shaft portion 121 is corrected to regular posture. As described above, predetermined perpendicularity and the like is secured between the first and second jigs 131 and 132. Thus, at the time point when the first jig 131 and the second jig 132 are brought into contact with each other, alignment is performed between the shaft portion 121 and the flange portion 122. Simultaneously, predetermined perpendicularity is secured between the radial bearing surface A11 of the shaft portion 121 and the thrust bearing surfaces B11 and C11 of the flange portion 122.

Next, the laser beam 133 is applied from the laser irradiation device (not shown) so as to pass through the inner periphery of the smaller diameter portion 132a of the second jig 132 and to form the welded portion 114 in an annular shape on an annular contact portion between the flange portion 122 and the shaft portion 121. Then, application of the laser beam 133 is stopped and the second jig 132 is restored to the original position. After that, the shaft portion 121 is taken out from the first jig 131, and the shaft member 102 as a finished product illustrated in FIG. 13 is obtained.

As described above, in this embodiment, the aligning mechanism 111 is interposed between the shaft portion 121 and the flange portion 122, and hence the flange portion 122 is allowed to rock in a swinging manner with respect to the shaft portion 121. Thus, merely by regulating the relative posture of the shaft portion 121 and the flange portion 122 with the jigs 131 and 132, it is possible to perform centering between the shaft portion 121 and the flange portion 122 and to perform alignment therebetween with high accuracy. Further, relative posture of the shaft portion 121 and the flange portion 122 can be regulated with jigs 131 and 132, and hence the shaft portion 121 and the flange portion 122 can be fixed by welding while being held in linear contact with each other in a ring shape (the welded portion 114 can be formed in a ring shape). Thus, it is possible to increase welding strength. Accordingly, the shaft member 102 excellent in both accuracy and strength can be easily manufactured. In particular, in this embodiment, the shaft portion 121 and the flange portion 122 are fixed to each other by laser welding, instead of resistance welding which involves difference (non-uniformity) in welding strength in accordance with contact area. Thus, stable welding strength can be obtained.

Further, the aligning mechanism 111 is constituted by the aligning surface 112 provided on the shaft portion 121 and the recessed portion 113 provided in the flange portion 122. Thus, it is possible to effectively prevent the problem of cost increase which may be involved in the case of performing centering of the shaft portion 121 and the flange portion 122 with another member.

Further, in this embodiment, the aligning surface 112 is formed in a convex-curved shape (spherical shape), and hence, even when the recessed portion 113 is formed in any form, the shaft portion 121 and the flange portion 122 are allowed to rock in a swinging manner in a state of being held in linear contact. Thus, when the jigs 131 and 132 are brought into contact with each other, it is possible to secure not only the perpendicularity between the shaft portion 121 and the flange portion 122, but also the perpendicularity between the upper and lower end surfaces 122a and 122b of the flange portion 122 (thrust bearing surfaces B11 and C11) with respect to the outer peripheral surface 121a (radial bearing surface A11) of the shaft portion 121.

Further, the shaft portion 121 and the flange portion 122 are fixed to each other by welding in the inside of the recessed portion 113. Thus, it is possible to avoid as much as possible deterioration of surface accuracy of the radial bearing surface A11 of the shaft portion 121 and the thrust bearing surfaces B11 and C11 of the flange portion 122, the deterioration being caused by thermal influence at the time of welding. Further, it is possible to effectively avoid adverse effects on bearing performance which are caused by welding marks protruding on the outer periphery of the shaft portion 121 and on the end portion side of the flange portion 122, that is, protruding in the radial bearing gaps and the thrust bearing gaps. In addition, in the structure according to this embodiment, in which the welded portion 114 is formed by application of the laser beam 133, molten matters may be dispersed in accordance with application of the laser beam 133. When the shaft portion 121 and the flange portion 122 are welded to each other in the inside of the recessed portion 113 (in the inside on the upper side of the flange portion 122), it is possible to cover the welded part with the inner wall surface of the recessed portion 113 (inner peripheral surface of the flange portion 122). Thus, it is possible to effectively prevent the molten matters from being dispersed and adhering, for example, to the end surfaces 122a and 122b of the flange portion 122.

Note that, in this embodiment, the shaft portion 121 and the flange portion 122 are formed of stainless steel of the same type. With laser welding, it is possible to secure high welding strength even between different metals unlike resistance welding by which high welding strength therebetween is difficult to secure. Thus, as long as the strength necessary for the shaft member 102 can be secured, it is possible to increase a degree of freedom in selection of materials for forming the shaft portion 121 and the flange portion 122, that is, possible to select and use the optimum material in accordance with required quality. In this regard, it is possible to achieve cost reduction of the shaft member 102. For example, the shaft portion 121 may be formed of stainless steel, and the flange portion 122 may be formed of brass or the like.

As long as alignment between the shaft portion 121 and the flange portion 122 can be performed and perpendicularity between the bearing surfaces can be secured, the shapes of the shaft portion 121 and the flange portion 122 may be arbitrarily changed.

Figure 16A:
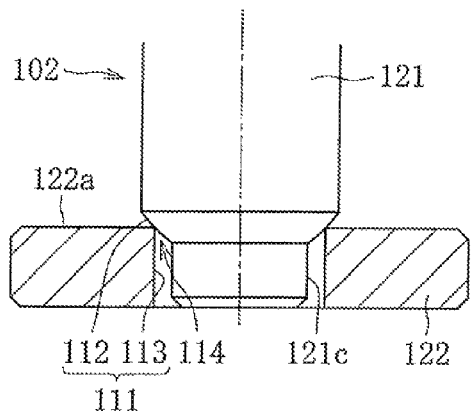
FIG. 16A is a main-part enlarged sectional view which conceptually illustrates a modification of the shaft member illustrated in FIG. 13.

For example, as illustrated in FIG. 16A, the shaft portion 121 may further include a smaller diameter portion 121c extending downward from the aligning surface 112 so as to be accommodated along the inner periphery of the recessed portion 113 (through-hole) of the flange portion 122. With this structure, the space formed on the inner periphery of the flange portion 122 can be plugged with the smaller diameter portion 121c, and hence it is possible to reduce an amount of a lubricating oil filling the inside of the bearing in comparison with that in the structure illustrated in FIG. 13. Thus, it is possible to reduce the axial dimension of the seal space S11 so as to compactify the fluid dynamic bearing device, or possible to increase the bearing span between the radial bearing portions R11 and R12 so as to increase bearing rigidity.

Figure 16B:
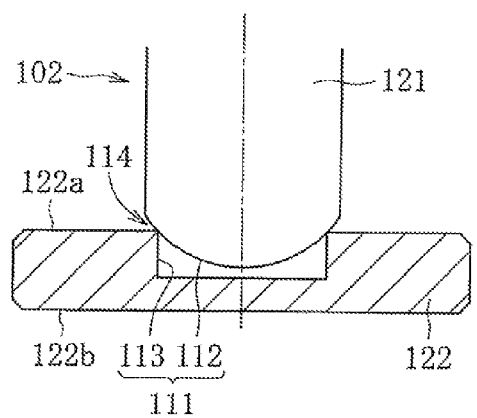
FIG. 16B is a main-part enlarged sectional view which conceptually illustrates another modification of the shaft member illustrated in FIG. 13.

Further, for example, as illustrated in FIG. 16B, the recessed portion 113 provided in the flange portion 122 may be formed not as a through-hole but in a recessed shape. In this case, the shaft portion 121 and the flange portion 122 can be fixed to each other by welding through formation of the welded portion 114 in an annular gap between the aligning surface 112 of the shaft portion 121 and the upper end surface 22a of the flange portion 122.

Figure 16C:
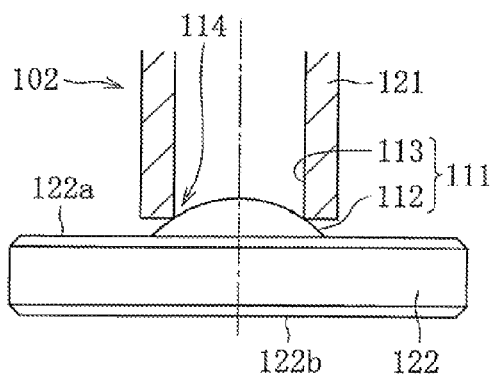
FIG. 16C is a main-part enlarged sectional view which conceptually illustrates another modification of the shaft member illustrated in FIG. 13.
Figure 16D:
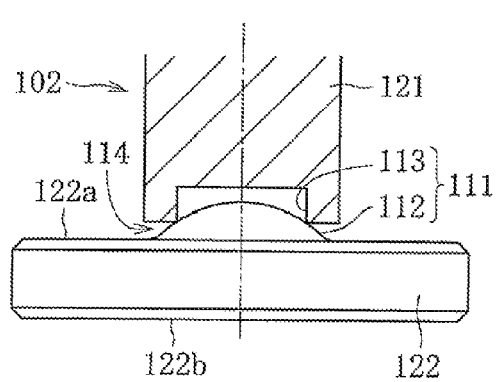
FIG. 16D is a main-part enlarged sectional view which conceptually illustrates another modification of the shaft member illustrated in FIG. 13.

Description is made hereinabove of the case where the aligning mechanism 111 is constituted by the aligning surface 112 of the shaft portion 121 and the recessed portion 113 of the flange portion 122. The aligning mechanism 111 may be constituted by the aligning surface 112 provided on the flange portion 122 and the recessed portion 113 provided in the shaft portion 121. Specifically, as illustrated in FIGS. 16C and 16D, for example, the flange portion 122 may be provided with the aligning surface 112 formed in a convex-spherical shape and gradually reduced in diameter toward the shaft portion 121 and the shaft portion 121 may be provided with the recessed portion 113 formed as a through-hole or in a recessed shape. With this, the shaft portion 121 and the flange portion 122 can be fixed to each other by welding while being held in contact with each other in a ring shape.

Note that, in FIGS. 13, 16A, and 16C, the welded portion 114 is formed in the inside of the recessed portion 113 so that the shaft portion 121 and the flange portion 122 are fixed to each other by welding. Alternatively, as illustrated in FIGS. 16B and 16D, the welded portion 114 may be formed in the annular gap between the lower end surface of the shaft portion 121 and the upper end surface 122a of the flange portion 122. Further, for the purpose of further increasing strength of the shaft member 102, the welded portion 114 may be formed in each of the inside of the recessed portion 113 and the annular gap so that the shaft portion 121 and the flange portion 122 are fixed to each other by welding.

Description is made hereinabove of the fluid dynamic bearing device 101 according to a first embodiment of the present invention, the fluid dynamic bearing device 101 adopting a second structure of the present invention. In this context, the second structure of the present invention is applicable not only to the fluid dynamic bearing device 101 described above. In the following, description is made on a fluid dynamic bearing device 101 according to another embodiment of the present invention, the fluid dynamic bearing device 101 adopting the second structure of the present invention. In the following, the components similar to those described above are denoted by the same reference symbols, and redundant description thereof is omitted.

Figure 17:
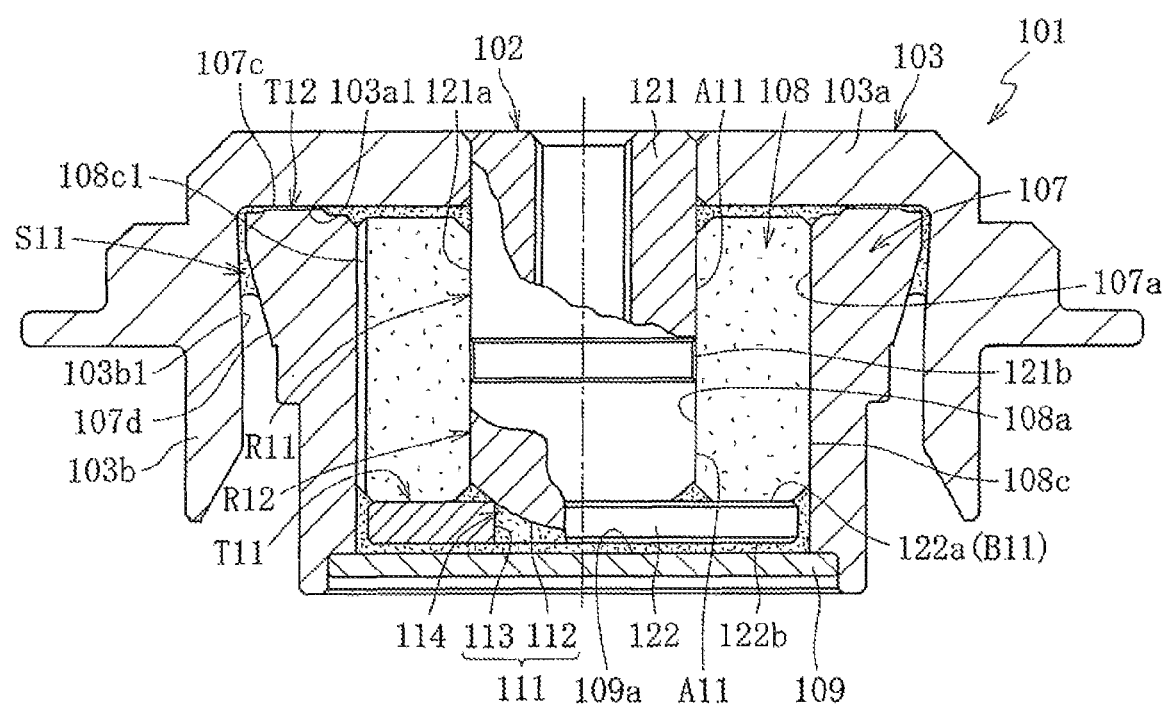
FIG. 17 is a sectional view of a fluid dynamic bearing device according to a second embodiment of the present invention, the fluid dynamic bearing device adopting the second structure of the present invention.

FIG. 17 illustrates a fluid dynamic bearing device 101 according to a second embodiment of the present invention, the fluid dynamic bearing device 101 adopting the second structure of the present invention. The fluid dynamic bearing device 101 illustrated in FIG. 17 is different from that illustrated in FIG. 13 in the following points: the thrust bearing surface C11 is not formed on the lower end surface 122b of the flange portion 122, and the second thrust bearing portion T12 is provided between a lower end surface 103a1 of a disk portion 103a of the disk hub 103 fixed to the upper end of the shaft portion 121 and an upper end surface 107c of the housing 107; and the seal space S11 is provided between a tapered outer peripheral surface 107d of the housing 107 and an inner peripheral surface 103b1 of a cylindrical portion 103b of the disk hub 103. Note that, although the structure in which the shaft member 102 as illustrated in FIG. 13 is used in the illustration, as a matter of course, it is also possible to use the shaft member 102 structured as illustrated in FIGS. 16A to 16D.

Figure 18:
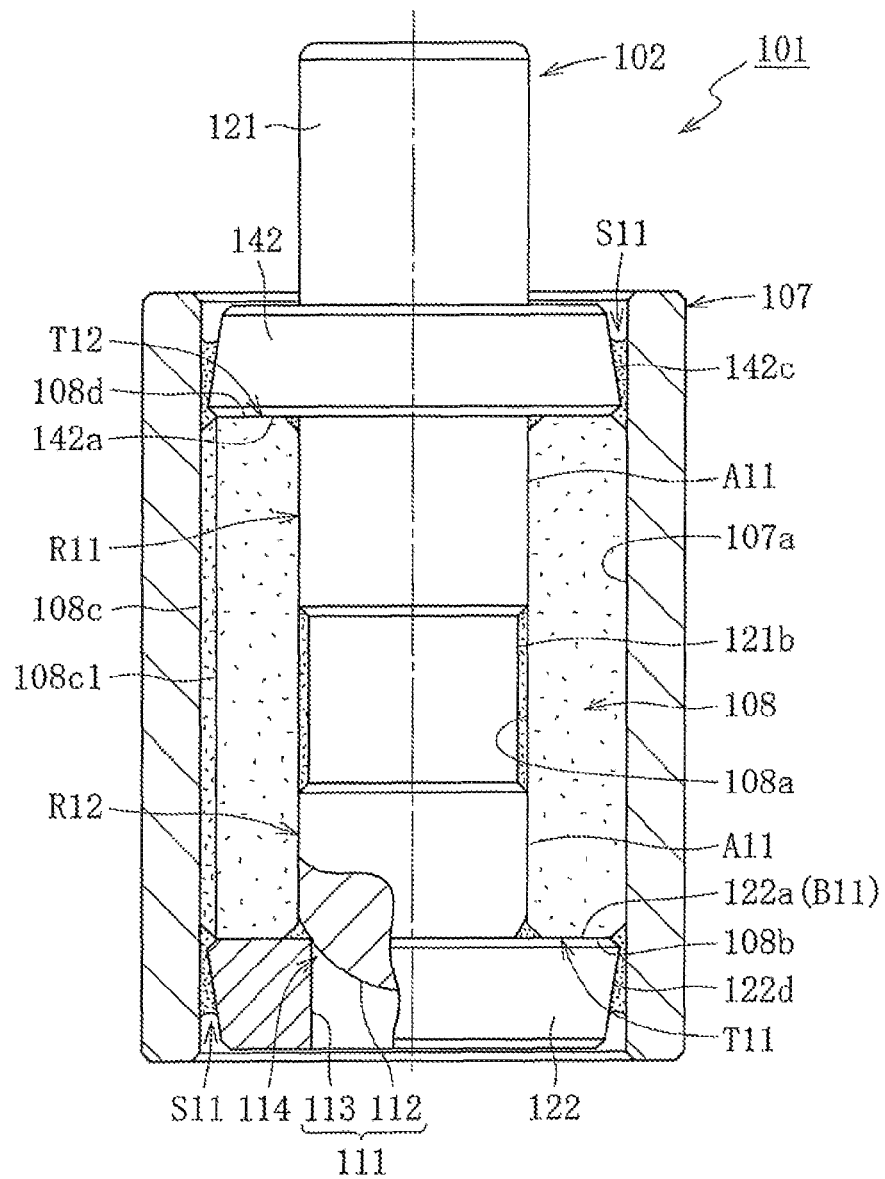
FIG. 18 is a sectional view of a fluid dynamic bearing device according to a third embodiment of the present invention, the fluid dynamic bearing device adopting the second structure of the present invention.

FIG. 18 illustrates a fluid dynamic bearing device 101 according to a third embodiment of the present invention, the fluid dynamic bearing device 101 adopting the second structure of the present invention. The fluid dynamic bearing device illustrated in FIG. 18 is structurally different from that described in the above-mentioned embodiment illustrated in FIGS. 13 and 17 in the following points: the shaft member 102 further includes a second flange portion 142 fixed at the substantially center in the axial direction of the shaft portion 121; the second thrust bearing portion T12 is provided between the second flange portion 142 and the upper end surface 108d of the bearing sleeve 108; and the seal space S11 is formed between outer peripheral surfaces 122e and 142e of both the flange portions 122 and 142 and the inner peripheral surface 107a of the housing 107. Even when using the shaft member 102 including the shaft portion 121 provided with the two flange portions 122 and 142 as in this case, the above-mentioned second structure of the present invention is applicable to a product in which the shaft portion 121 and the flange portion 122 provided at the lower end of the shaft portion 121 are integrated with each other. As a matter of course, also in this embodiment, it is possible to use the shaft member 102 illustrated in FIGS. 16A to 16D.

Figure 19:
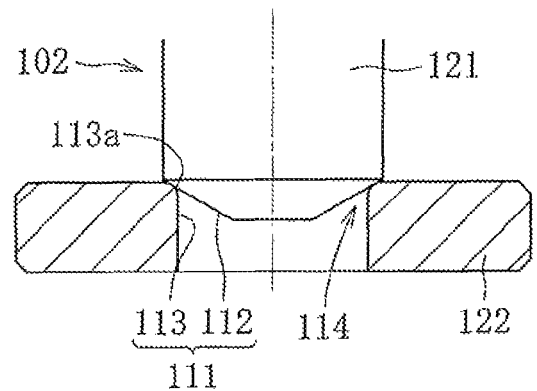
FIG. 19 is a main-part enlarged sectional view of the shaft member illustrated in FIG. 13 according to another example.

Description is made hereinabove of the shaft member 102 having the aligning surface 112 formed in a convex-curved shape (spherical shape) and the fluid dynamic bearing device 101 incorporating the same. In this context, the aligning surface 112 may be formed as a tapered shape as illustrated in FIG. 19. In this case, it is desirable that an inner peripheral edge of the recessed portion 113, strictly, at least an inner peripheral edge (upper-end inner peripheral edge of the flange portion 122 in the illustration) 113a on a side on which the aligning surface 112 is introduced be formed as a convex-curved surface (round surface). With this structure, the shaft portion 121 and the flange portion 122 exhibit a relation of being rockable in a swinging manner as in the embodiments described hereinabove. In addition, when the shaft portion 121 and the flange portion 122 are welded to each other, it is possible to secure not only the coaxiality therebetween but also the perpendicularity therebetween, simultaneously. This structure is suitably applicable to any of the embodiments described hereinabove.

Note that, in consideration of easiness of processing (processing cost) of the aligning surface 112, it is advantageous that the aligning surface 112 is formed in a tapered shape rather than a convex-curved shape. However, at the time of fixing the shaft portion 121 and the flange portion 122 by welding, in order to secure the coaxiality and perpendicularity therebetween, it is necessary to process the inner peripheral edge 113a of the recessed portion 113 as a round surface as described above. The processing cost depends also on materials for forming the shaft portion 121 and the flange portion 122. Thus, it is sufficient that the structure to be adopted is appropriately selected in accordance with the materials used therefor.

In both the fluid dynamic bearing devices 1 and 101 described hereinabove, the housing and the bearing sleeve are provided as separate members. Meanwhile, the present invention is suitably applicable to fluid dynamic bearing devices in which the housing and the bearing sleeve are integrated with each other. Further, especially in the fluid dynamic bearing devices illustrated in FIGS. 2, 10, and 13, any one of the lid member and the seal member may be integrated with the housing.

Further, the structure is illustrated hereinabove in which the dynamic pressure generating grooves in a herringbone pattern or a spiral pattern are provided as the radial bearing portions and the thrust bearing portions so as to generate dynamic pressure effects of the lubricating oil. In this context, it is also possible to adopt, as the radial bearing portions, so-called step bearings, multi-arc bearings, or non-complete round bearings, and to adopt, as the thrust bearing portions, so-called step bearings or corrugated bearings. Further, hereinabove, the structure is illustrated in which the radial bearing portions are formed at two portions separately from each other in the axial direction. Meanwhile, the radial bearing portions may be provided at one portion or three or more portions in the axial direction.

Further, description is made hereinabove of the case where both the radial bearing portions formed at two portions separately from each other in the axial direction are constituted by the dynamic pressure bearings. Meanwhile, one of or both the radial bearing portions may be constituted by a bearing of another type. For example, while not shown, the radial bearing surfaces of the shaft member may be formed in a complete-circular shape and an inner peripheral surface of the bearing sleeve opposite thereto may be formed as a complete-circular inner peripheral surface. With this, it is possible to constitute a so-called complete-circular bearing.

The invention claimed is:

1. A fluid dynamic bearing device, comprising:
   a shaft member comprising
      a shaft portion, and
      a flange portion provided at one end of the shaft portion;
   radial bearing gaps formed with an outer peripheral surface of the shaft portion; and
   thrust bearing gaps formed with end surfaces of the flange portion,
   wherein the flange portion has an annular shape, and
   wherein a welded portion is formed by fixing the flange portion and the shaft portion to each other by welding at an end portion of said flange portion which is axially closest to the radial bearing gaps, on an inner periphery of the flange portion.

2. A fluid dynamic bearing device according to claim 1, wherein an end surface of the shaft portion and the end surface of the flange portion which is axially closest to the radial bearing gaps are held in contact with each other.

3. A fluid dynamic bearing device according to claim 1, wherein an aligning surface is provided on the shaft portion, the aligning surface being held in contact with an inner peripheral edge portion of the flange portion which is axially closest to the radial bearing gaps.

4. A fluid dynamic bearing device according to claim 1, wherein an aligning surface is provided on an inner peripheral edge portion of the flange portion which is axially closest to the radial bearing gaps, the shaft portion being held in contact with the aligning surface.

5. A fluid dynamic bearing device according to claim 1, wherein the welded portion is formed by applying a laser beam to the inner periphery the end portion of the flange portion which is axially closest to the radial bearing gaps.

6. A fluid dynamic bearing device according to claim 1, wherein the welded portion is formed by applying a laser beam to a protrusion provided at an inner peripheral surface of an end portion of the flange portion which is axially closest to the radial bearing gaps.

7. A fluid dynamic bearing device according to claim 1, wherein the welded portion is formed in an annular shape.

8. A fluid dynamic bearing device according to claim 1, wherein the welded portion is intermittently formed in a circumferential direction.

9. A fluid dynamic bearing device, comprising:
   a shaft member comprising
      a shaft portion and
      a flange portion provided at one end of the shaft portion;
   radial bearing gaps formed with an outer peripheral surface of the shaft portion; and
   thrust bearing gaps formed with end surfaces of the flange portion,
   wherein the shaft portion and the flange portion are fixed to each other by welding in a state in which an aligning mechanism is interposed therebetween and both the shaft portion and the flange portion are held in linear contact with each other.

10. A fluid dynamic bearing device according to claim 9, wherein the aligning mechanism is formed on any one of the shaft portion and the flange portion and comprises:
    an aligning surface gradually reduced in diameter toward another one of the shaft portion and the flange portion; and
    a recessed portion formed in the another one of the shaft portion and the flange portion so as to accommodate a leading end of the aligning surface.

11. A fluid dynamic bearing device according to claim 10, wherein the aligning surface comprises a tapered surface.

12. A fluid dynamic bearing device according to claim 10, wherein the aligning surface comprises a convex-curved surface.

13. A fluid dynamic bearing device according to claim 10, wherein the shaft portion and the flange portion are fixed to each other by welding in an inside of the recessed portion.

* * * * *